United States Patent
Benmakrelouf et al.

(10) Patent No.: US 12,136,040 B2
(45) Date of Patent: Nov. 5, 2024

(54) RESOURCE NEEDS PREDICTION IN VIRTUALIZED SYSTEMS: GENERIC PROACTIVE AND SELF-ADAPTIVE SOLUTION

(71) Applicant: Telefonaktiebolaget LM Ericsson (publ), Stockholm (SE)

(72) Inventors: Souhila Benmakrelouf, Montreal (CA); Nadjia Kara, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1136 days.

(21) Appl. No.: 16/965,193

(22) PCT Filed: Feb. 5, 2019

(86) PCT No.: PCT/IB2019/050907
§ 371 (c)(1),
(2) Date: Jul. 27, 2020

(87) PCT Pub. No.: WO2019/150343
PCT Pub. Date: Aug. 8, 2019

(65) Prior Publication Data
US 2021/0064432 A1 Mar. 4, 2021

Related U.S. Application Data

(60) Provisional application No. 62/626,206, filed on Feb. 5, 2018.

(51) Int. Cl.
G06F 9/50 (2006.01)
G06N 3/086 (2023.01)
G06N 3/126 (2023.01)

(52) U.S. Cl.
CPC ......... *G06N 3/086* (2013.01); *G06F 9/5077* (2013.01); *G06N 3/126* (2013.01); *G06F 2209/5019* (2013.01)

(58) Field of Classification Search
CPC ...... G06N 3/086; G06N 3/126; G06F 9/5077; G06F 2209/5019
See application file for complete search history.

(56) References Cited

U.S. PATENT DOCUMENTS

| | | | |
|---|---|---|---|
| 11,132,616 B2 * | 9/2021 | Iwamasa | G06N 7/01 |
| 2005/0213586 A1 * | 9/2005 | Cyganski | H04L 47/28 370/395.41 |

(Continued)

FOREIGN PATENT DOCUMENTS

| | | | | |
|---|---|---|---|---|
| CN | 101112063 A | * | 1/2008 | H04L 1/1607 |
| CN | 1980210 B | * | 11/2010 | |

(Continued)

OTHER PUBLICATIONS

Veerabhadra R. Chandakanna etc., "A sliding window based self-learning and adaptive load balancer", published in Journal of Network and Computer Applications vol. 56, pp. 188-205 (2015), retrieved Dec. 11, 2023. (Year: 2015).*

(Continued)

*Primary Examiner* — Shourjo Dasgupta
(74) *Attorney, Agent, or Firm* — Weisberg I.P. Law, P.A.

(57) ABSTRACT

A method for real-time prediction of resource consumption by a system is provided that includes determining a real-time prediction of resource demand by the system. A Genetic Algorithm (GA) is used to dynamically determine an optimal size of a sliding window and an optimal number of predicted data within the real-time prediction of the resource demand. The data within the real-time prediction of the resource demand is adjusted based on an estimated probability of prediction errors and a variable padding, which is based on a mean of at least one previous standard deviation of the predicted data within the real-time prediction of the resource demand.

14 Claims, 14 Drawing Sheets

(56) References Cited

U.S. PATENT DOCUMENTS

| | | | | |
|---|---|---|---|---|
| 2015/0039764 A1* | 2/2015 | Beloglazov | ............ | H04L 67/52 709/226 |
| 2015/0112900 A1* | 4/2015 | Ariyoshi | ................ | G06N 20/00 706/46 |

FOREIGN PATENT DOCUMENTS

| | | | | | |
|---|---|---|---|---|---|
| CN | 102855584 | A | * | 1/2013 | |
| CN | 103093284 | A | * | 5/2013 | |
| CN | 105227369 | A | * | 1/2016 | ......... H04L 41/0896 |
| JP | 68710110 | B2 | * | 5/2021 | |

OTHER PUBLICATIONS

Ali Yadavar Nikravesh etc., "An autonomic prediction suite for cloud resource provisioning", Journal of Cloud Computing Advances, Systems and Applications (2017), retrieved Dec. 11, 2023. (Year: 2017).*

Tuan Le Anh, "Workload prediction for resource management in data centers", UMNAD, p. 42 (2016), retrieved Dec. 11, 2023. (Year: 2016).*

Maryam Jamela Ismail etc., "Adaptive Neural Network Prediction Model for Energy Consumption", 2011 3rd International Conference on Computer Research and Development, Mar. 11-13, 2011, retrieved Dec. 11, 2023. (Year: 2011).*

Napasool Wongvanich etc., "Adaptive Window Flow Control in MPLS Networks using Enhanced Kalman Filtering", Telecommunication Networks and Applications Conference (2008), published Jan. 2009, retrieved Dec. 11, 2023. (Year: 2009).*

Roger M. Jarvis etc., "Genetic algorithm optimization for preprocessing and variable selection of spectroscopic data", Bioinformatics, vol. 27, pp. 860-868 (2005), retrieved Dec. 11, 2023. (Year: 2005).*

Fariborz Derakhshan etc., "On prediction of resource consumption of service requests in cloud environments", 20th Conference on Innovations in Clouds, Internet and Networks, Mar. 2017, retrieved Dec. 11, 2023. (Year: 2017).*

Xiang Sun etc., "Optimizing Resource Utilization of a Data Center", IEEE Communications Surveys & Tutorials, vol. 18, issue 4, 2016, retrieved Dec. 11, 2023. (Year: 2016).*

Alireza Khoshkbarforoushha etc., "Resource usage estimation of data stream processing workloads in datacenter clouds", published to arXiv.org in Jan. 2015, retrieved Dec. 11, 2023. (Year: 2015).*

Pramod Bhatotia etc., "Slider: incremental sliding window analytics", published Middleware '14: Proceedings of the 15th International Middleware Conference, pp. 61-72 (Dec. 2014), retrieved Dec. 11, 2023. (Year: 2014).*

Mehmet Demirci, "A Survey of Machine Learning Applications for Energy-Efficient Resource Management in Cloud Computing Environments", published in 2015 IEEE 14th International Conference on Machine Learning and Applications (Dec. 2015), retrieved Dec. 11, 2023. (Year: 2015).*

Dang Tran etc., "PD-GABP—A novel prediction model applying elastic applications in distributed environment", published in 2016 3rd National Foundation for Science and Technology Development Conference on Information and Computer Science, retrieved Dec. 11, 2023. (Year: 2016).*

Lei Yang etc., "Optimization of Virtual Resources Provisioning for Cloud Applications to cope with Traffic Burst", published in 2017 IEEE International Symposium on Parallel and Distributed Processing with Applications and one other conference, retrieved Dec. 11 (Year: 2017).*

Jui-Sheng Chou etc., "Time series analytics using sliding window metaheuristic optimization-based machine learning system for identifying building energy consumption patterns", published in Applied Energy, vol. 177, pp. 751-770 (2016), retrieved Dec. 11, 2023. (Year: 2016).*

Saber M. Elsayed, etc., "A Surrogate-assisted Differential Evolution Algorithm with Dynamic Parameters Selection for Solving Expensive Optimization Problems", published via 2014 IEEE Congress on Evolutionary Computation, Jul. 6-11, 2014, Beijing, China, retrieved Jun. 21, 2024. (Year: 2014).*

Yaochu Jin, etc., "A Framework for Evolutionary Optimization With Approximate Fitness Functions", published via IEEE Transactions on Evolutionary Computation, vol. 6, No. 5, Oct. 2002, p. 481, retrieved Jun. 21, 2024. (Year: 2002).*

Rui Tang, etc., "A Variable-Sized Sliding-Window Approach for Genetic Association Studies via Principal Component Analysis", published in Ann Hum Genet. Nov. 2009 ; 73(Pt 6): 631-637. doi: 10.1111/j.1469-1809.2009.00543.x., retrieved Jun. 21, 2024. (Year : 2009).*

Vladimir Braverman, etc., "Optimal Sampling from Sliding Windows", published via ACM PODS '09, Providence, RI, USA, retrieved Jun. 21, 2024. (Year: 2009).*

Vladimir Braverman, "Sliding Window Algorithms" in Encyclopedia of Algorithms, pp. 2006-2011, 2007, retrieved Jun. 21, 2024. (Year: 2007).*

Ahmed Kattan, etc., "Transformation of Input Space using Statistical Moments: EA-Based Approach", published via 2014 IEEE Congress on Evolutionary Computation (CEC), Jul. 6-11, 2014, Beijing, China, retrieved Jun. 21, 2024. (Year: 2014).*

Balaji P.G., etc., "Uncertainties reducing Techniques in evolutionary computation", published via 2007 IEEE Congress on Evolutionary Computation, Sep. 25-Sep. 28, 2007, Singapore, retrieved Jun. 21, 2024. (Year: 2007).*

Arief Gusnanto, etc., "Estimating optimal window size for analysis of low-coverage next-generation sequence data", published via Bioinformatics, vol. 30 No. 13 2014, pp. 1823-1829, retrieved Jun. 21, 2024. (Year: 2014).*

Jyh-Cheng Yu, etc., "Evolutionary Reliable Regional Kriging Surrogate and Soft Outer Array for Robust Engineering Optimization", published via IEEE Access on Aug. 22, 2017, retrieved Jun. 21, 2024. (Year: 2017).*

Lai Xiongming, etc., "Mechanism reliability analysis based on Kriging model and genetic algorithm", published via 2011 International Conference on Consumer Electronics, Communications, and Networks, Apr. 16-Apr. 18, 2011, Xianning, China, retrieved Jun. 21, 2024. (Year: 2011).*

James M. Whitacre, "Adaptation and Self-Organization in Evolutionary Algorithms", published in arXiv at index 0907.0516 as of Jul. 3, 2009, retrieved Jun. 21, 2024. (Year: 2009).*

Yaochu Jin, etc., "Evolutionary Optimization in Uncertain Environments—A Survey", published via IEEE Transactions on Evolutionary Computation, vol. 9, No. 3, Jun. 2005, retrieved Jun. 21, 2024 (Year: 2005).*

International Search Report and Written Opinion of the International Searching Authority dated Jun. 11, 2019 issued in PCT Application No. PCT/IB2019/050907, consisting of 9 pages.

Chaudhari Shilpa Shashikant et al: "Traffic and mobility aware resource prediction using cognitive agent in mobile ad hoc networks", Journal of Network and Computer Applications, Academic Press, New York, NY, US, vol. 72, Jun. 25, 2016 (Jun. 25, 2016) , pp. 87-103, XP029695667, consisting of 18 pages.

Prodan R et al: Prediction-based real-time resource provisioning for massively multiplayer online games, Future Generations Computer Systems, Elsevi Er Science Publishers. Amsterdam, vol. 25, No. 7, Jul. 1, 2009 (Jul. 1, 2009) , pp. 785-793, XP026115444, consisting of 10 pages.

Amiri Maryam et al: "Survey on prediction models of applications for resources provisioning in cloud", Journal of Network and Computer Applications, Academic Press, New York, NY, US, vol. 82, Jan. 18, 2017 (Jan. 18, 2017) , pp. 93-113, XP029930260, consisting of 22 pages.

Gambi Alessio et al: Kriging-Based Self-Adaptive Cloud Controllers, IEEE Transactions on Services Computing, IEEE, USA, vol. 9, No. 3, May 1, 2016 (May 1, 2016) , pp. 368-381, XP011613099, consisting of 14 pages.

* cited by examiner

| Study Reference | Target | Granularity | Model | Criteria | | | | |
|---|---|---|---|---|---|---|---|---|
| | | | | Adaptability | Prediction based on | Adjustment / Padding | SLA Sensitive | Energy Aware |
| [A] | Short and Long-term Prediction of Resource Demand | Applications in Cloud | Bayesian Model | | cyclical and/or seasonal patterns | | | Does Not Apply |
| [B] | Short-term Prediction | | ARMA time series | | | | | |
| [C] | One-step-ahead Prediction | Network Traffic | Double Exponential Smoothing, ARMA, Artificial Neural Network and Wavelet | Non Adaptive | Historical Data, Training Data | | | Performance and Energy Overhead of Predictors |
| [D] | One-step-ahead Prediction | Multi-tier Applications Deployment Performance in Cloud | Multiple Linear Regression | | Historical Data | Does Not Apply | Does Not Apply | Impact of Applications Deployment on Resource Usage and Performance |

FIGURE 1A

| Study Reference | Target | Criteria | | | | | | |
|---|---|---|---|---|---|---|---|---|
| | | Granularity | Model | Adaptability | Prediction based on | Adjustment / Padding | SLA Sensitive | Energy Aware |
| [E] | Long-term Prediction | CPU Load | Fourier Transform, Tendency-based Method to predict the variation | | Seasonal Variation | | | |
| [F] | Multi-step-ahead Prediction | CPU Load | Support Vector Regression (SVR) and Smooth Kalman Filter | Non Adaptive to Unexpected Changes | Training Data (size of training data) | | | Does Not Apply |
| [G] | Self-adaptive cloud controller | Cloud Controller | Kriging models | Self-adaptive | | | Minimization of SLA Violation | |
| New Prediction Algorithm | Online Multi-step-ahead Prediction | Generic | Kriging Method and Time Series | Self-adaptive | Dynamic and Variable Sliding Window | Reactive Error Adjustment and Adaptive Padding | Reduction of under-provisioning | Reduction of over-provisioning |

FIGURE 1B

| Scenario | Strategy | Adaptive | Dynamic |
|---|---|---|---|
| Scenario1 without Adjustment, Padding and GA | Sliding window size, Number of Predicted Data | X | X |
| | Prediction - Kriging | ✓ | ✓ |
| | Adjustment and Padding | Do Not Apply | |
| Scenario2 Adjustment and Padding without GA | Sliding window size, Number of Predicted Data | ✓ | X |
| | Prediction - Kriging | ✓ | ✓ |
| | Adjustment and Padding | ✓ | ✓ |
| Scenario3 Adjustment, Padding and GA | Sliding window size, Number of Predicted Data | ✓ | ✓ |
| | Prediction - Kriging | ✓ | ✓ |
| | Adjustment and Padding | ✓ | ✓ |

FIGURE 4

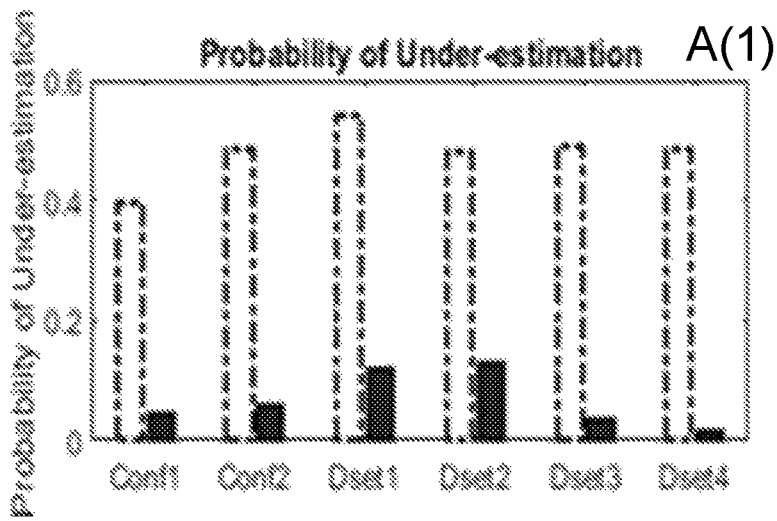
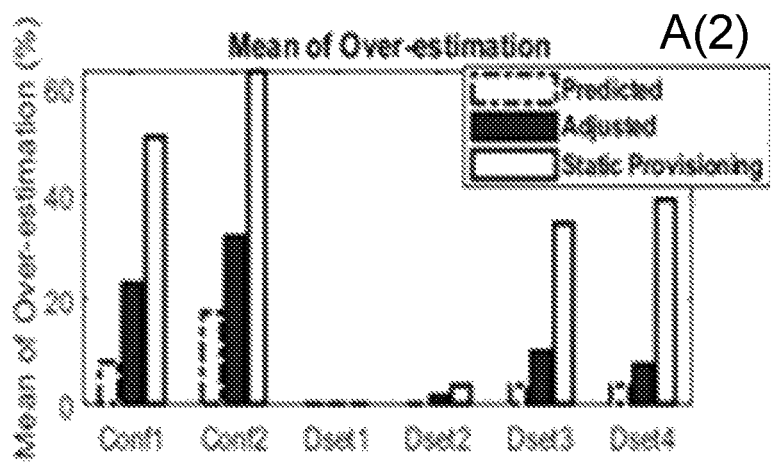
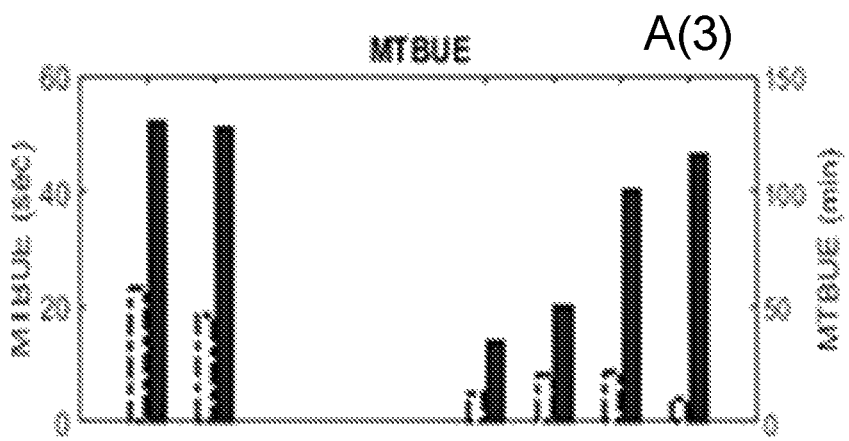
FIGURE 6A

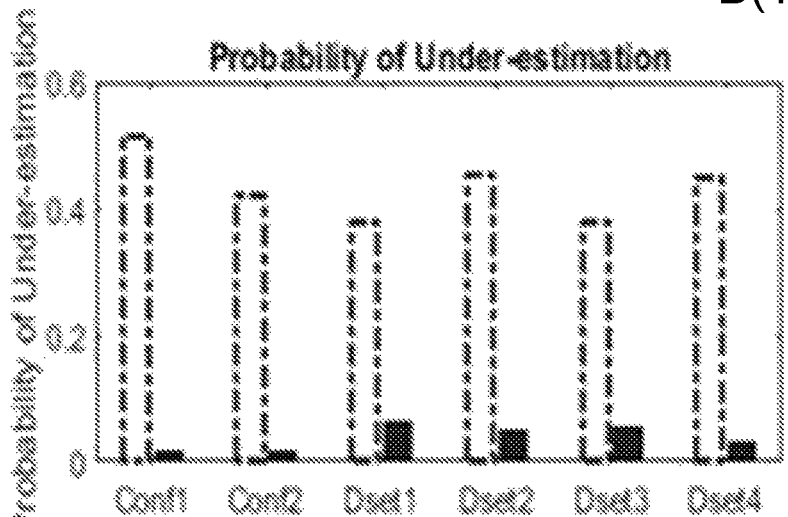
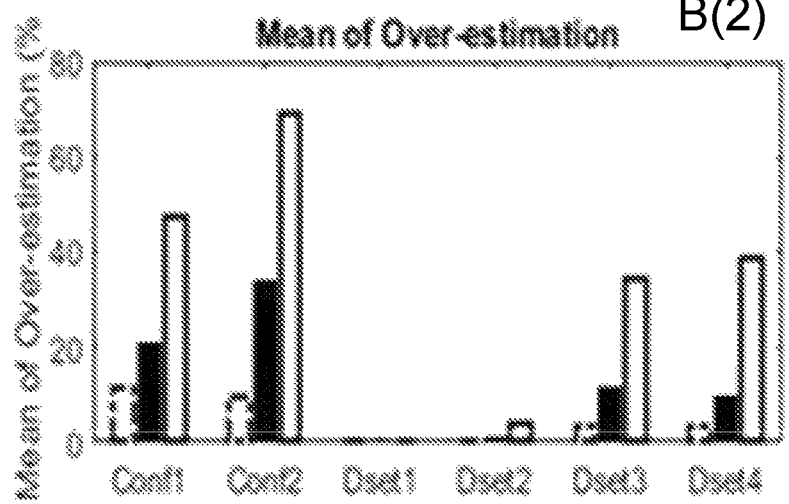
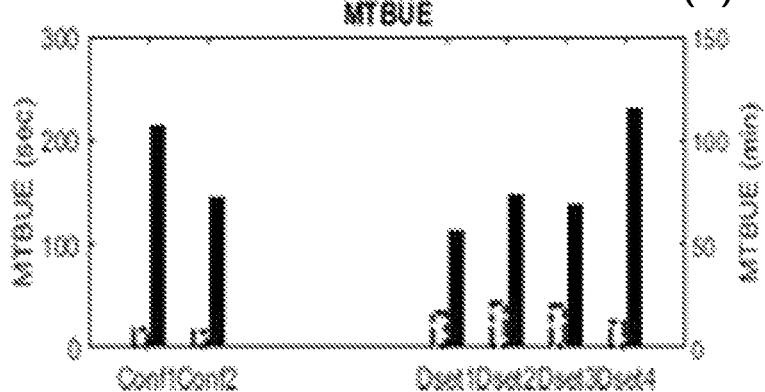
FIGURE 6B

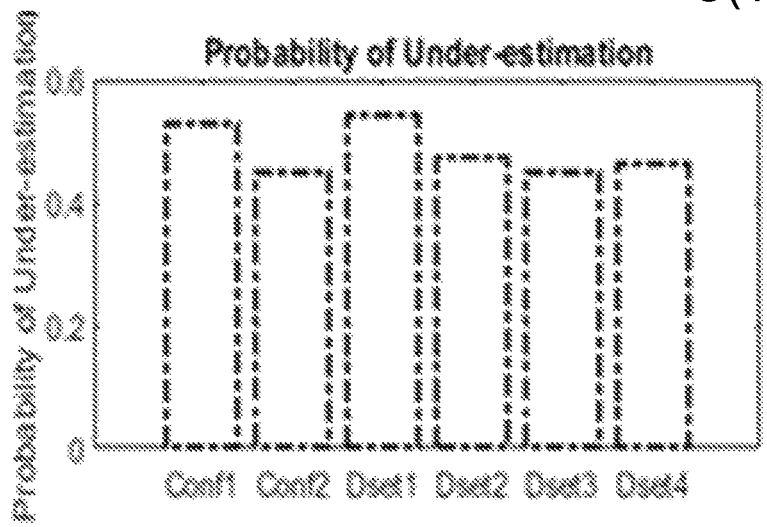
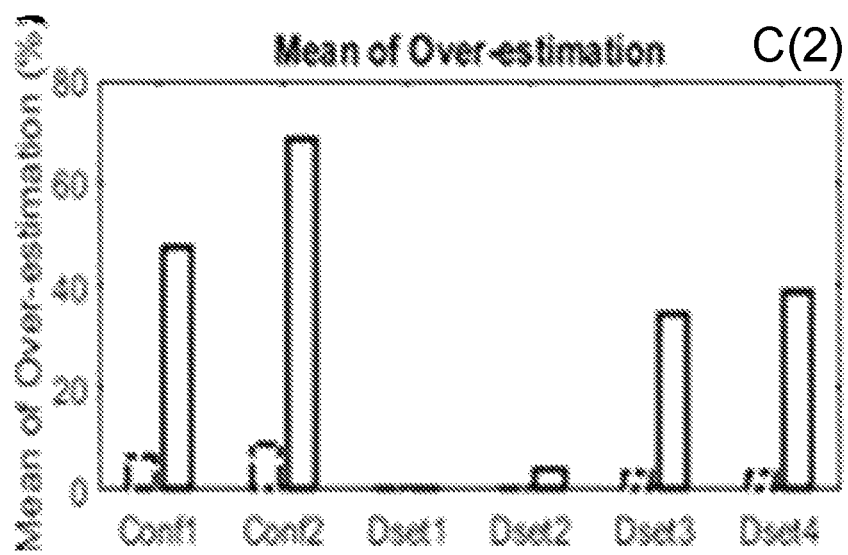
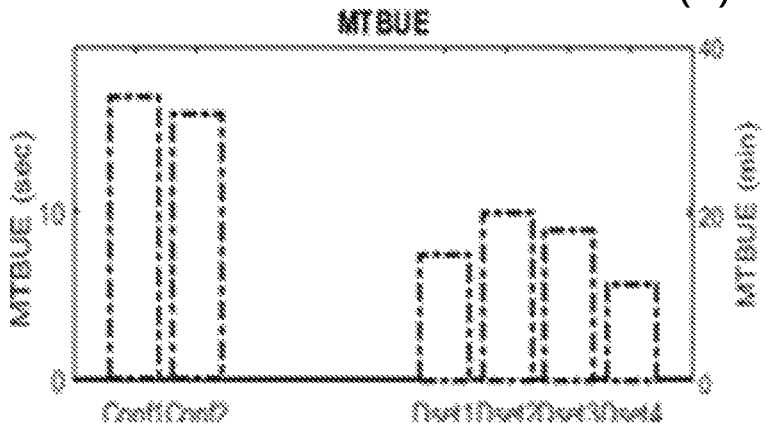
FIGURE 6C

RESOURCE NEEDS PREDICTION IN VIRTUALIZED SYSTEMS: GENERIC PROACTIVE AND SELF-ADAPTIVE SOLUTION

CROSS-REFERENCE TO RELATED APPLICATIONS

This application is a Submission Under 35 U.S.C. § 371 for U.S. National Stage Patent Application of International Application No.: PCT/IB2019/050907, filed Feb. 5, 2019 entitled "RESOURCE NEEDS PREDICTION IN VIRTUALIZED SYSTEMS: GENERIC PROACTIVE AND SELF-ADAPTIVE SOLUTION," which claims priority to U.S. Provisional Application No. 62/626,206, filed Feb. 5, 2018, entitled "RESOURCE NEEDS PREDICTION IN VIRTUALIZED SYSTEMS: GENERIC PROACTIVE AND SELF-ADAPTIVE SOLUTION," the entireties of both of which are incorporated herein by reference.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Resource management of virtualized systems in data centers is a critical and challenging task by reason of the complex applications and systems in such environments and the fluctuating workloads. Over-provisioning is commonly used to meet requirements of service level agreement (SLA) but it induces under-utilization of resources and energy waste. Therefore, provisioning virtualized systems with resources according to their workload demands is a crucial practice. Existing solutions fail to provide a complete solution in this regard, as some of them lack adaptability and dynamism in estimating resources and others are environment or application-specific, which limit their accuracy and their effectiveness in the case of sudden and significant changes in workloads.

Prediction approaches can be principally categorized into two classes. The first class is based on models deduced from the analysis of the system behavior. Existing studies based on such analytical models rely mostly on auto-regression and moving averages (See, P. K Hoong, I. K. Tan and C. Y. Keong, "Bittorrent Network Traffic Forecasting With ARMA," *International Journal of Computer Networks & Communications*, vol. 4, no 4, pp. 143-.156. 2012; M. F. Iqbal and L. K John, "Power and performance analysis of network traffic prediction techniques," *Performance Analysis of Systems and Software* (ISPASS), 2012 IEEE International Symposium, IEEE, 2012, pp. 112-113), multiple linear regression (W. Lloyd, S. Pallickara, O. David, J. Lyon, M. Arabi and K. Rojas, "Performance implications of multitier application deployments on Infrastructure-as-a-Service clouds: Towards performance modeling," *Future Generation Computer Systems*, vol. 29, no 5, pp. 1254-1264.2013), Fourier transform and tendency-based methods (See, J. Liang, J. Cao, J. Wang and Y. Xu, "Long-term CPU load prediction," *Dependable, Autonomic and Secure Computing* (DASC), 2011 IEEE Ninth International Conference, 2011, pp. 23-26. IEEE; A. Gandhi, Y. Chen, D. Gmach, M. Arlitt and M. Marwah, "Minimizing data center sla violations and power consumption via hybrid resource provisioning," *Green Computing Conference and Workshops (IGCC)*, 2011 International, IEEE, 2011, pp. 1-8), and cumulative distribution function (See, H. Goudarzi and M. Pedram, "Hierarchical SLA-driven resource management for peak power-aware and energy-efficient operation of a cloud datacenter," *IEEE Transactions on Cloud Computing*, vol. 4, no 2, pp. 222-236. 2016). However, all these models are static and non-adaptive to unexpected changes in the system behavior or in its environment.

The second class of resource prediction approaches is based on online processing of the data through machine learning. This approach benefits from dynamic and adaptive machine learning methods. But it is less accurate when compared to the analytical-model-based approaches as it may be affected by the non-reliability of the data measurement tools. Several studies have proposed machine learning methods for dynamic prediction of the resource usage, including Kalman filter (See, D. Zhang-Jian, C. Lee and R. Hwang, "An energy-saving algorithm for cloud resource management using a Kalman filter," *International Journal of Communications Systems*, vol. 27, no 12, pp. 4078-4091, 2013; W. Wang et al., "Application-level cpu consumption estimation: Towards performance isolation of multi-tenancy web applications," 2012 *IEEE 5th International Conference on Cloud computing*, IEEE, 2012, pp. 439-446), Support Vector Regression (SVR) (See, R. Hu, J. Jiang, G. Liu and L. Wang, "CPU Load Prediction Using Support Vector Regression and Kalman Smoother for Cloud," *Distributed Computing Systems Workshops (ICDCSW)*, 2013 *IEEE 33rd International Conference*, IEEE 2013, pp. 88-92; C. J. Huang et al, "An adaptive resource management scheme in cloud computing," *Engineering Applications of Artificial Intelligence*, vol. 26, no 1, pp. 382-389, 2013), Artificial Neural Network (ANN) (See, D. Tran, N. Tran, B. M. Nguyen and H. Le, "PD-GABP—A novel prediction model applying for elastic applications in distributed environment," *Information and Computer Science (NICS)*, 2016 *3rd National Foundation for Science and Technology Development Conferenc*, IEEE, 2016, pp. 240-245; K. Ma et al. "Spendthrift: Machine learning based resource and frequency scaling for ambient energy harvesting nonvolatile processors," *Design Automation Conference (ASP-DAC)*, 2017 *22nd Asia and South Pacific*, IEEE, 2017, pp. 678-683), Bayesian models (See, G. K. Shyam and S. S. Manvi, "Virtual resource prediction in cloud environment: A Bayesian approach,". *Journal of Network and Computer Applications*, vol. 65, pp. 144-154. 2016) and Kriging method (See, A. Gambi M. Pezzè and G. Toffetti, "Kriging-based self-adaptive cloud controllers," *IEEE Transactions on Services Computing*, vol. 9, no 3, pp. 368-381, 2016).

Certain previous prediction approaches use one or two methods (e.g., Kriging, Genetic Algorithm) for various purposes and in different contexts such as, for example, signal processing, telecommunication networks, oil drilling and Biocomputing. For example, a number of patents propose to use Kriging method as a predictive model and Genetic algorithm (GA) for dataset training in order to select the best fit predictive model. They create different training datasets by resampling and replacing the original one. Certain other approaches have used linear regression as a prediction method. They propose to optimize regression coefficients using GA. Still other approaches use a search aggregator which gathers prediction and adjustment processes from real-time traffic. Using aggregated search results, prediction adjustment module determines the distinctive features to dynamically adjust video analytics in one or more camera views where the target subject is expected to appear. Still another approach includes using measured data from sensors in order to adjust the predicted operating conditions of a turbine component.

A more recent approach defined a multivariable statistical model using Kriging regression method and GA which allows identification of optimal set of these variables. The approach allows dynamic selection of the optimal size of the sliding window and the optimal number of predicted data using GA. Kriging method is used as a dynamic machine learning-based prediction and GA results for dataset training and prediction process. As another example, an approach used GA to select the best candidates in testing procedures. This approach used GA for dynamic selection of the optimal size of the sliding window and the optimal number of predicted data. Yet another approach proposes to adjust predicted operating conditions of a turbine using predicted operating conditions and/or one or more measured data associated with the turbine operation. It uses estimated probability of the prediction errors and a variable padding for prediction adjustment.

However, there currently exist certain challenge(s). Based on historical observed data, the analytical models are application-specific and are not able to adapt to the behavioral changes in the systems. Moreover, techniques based on threshold rules assuming linearity and stability in the system, are not realistic solutions in the light of the complexity of the current systems, as well as their internal and external interactions. Furthermore, existing resource prediction approaches in the cloud use an excessive allocation of resources to avoid service level agreement (SLA) violation in cases of peak demand. This induces a waste of resources and energy, and increases the operating costs.

SUMMARY

There are, proposed herein, various embodiments which address one or more of the issues described above. According to certain embodiments, for example, a prediction algorithm is proposed to address the limitations of existing prediction approaches.

According to certain embodiments, a method is provided that includes determining a real-time prediction of resource demand by the system. Genetic Algorithm (GA) is used to dynamically determine an optimal size of a sliding window and an optimal number of predicted data within the real-time prediction of the resource demand. The data within the real-time prediction of the resource demand is adjusted based on an estimated probability of prediction errors and a variable padding, which is based on a mean of at least one previous standard deviation of the predicted data within the real-time prediction of the resource demand.

According to certain embodiments, a non-transitory computer-readable medium stores instructions for real-time prediction of resource consumption by a system. The instructions are executed by processing circuitry to determine a real-time prediction of resource demand by the system and use GA to dynamically determine an optimal size of a sliding window and an optimal number of predicted data within the real-time prediction of the resource demand. The data within the real-time prediction of the resource demand is adjusted based on an estimated probability of prediction errors and a variable padding. The variable padding is based on a mean of at least one previous standard deviation of the predicted data within the real-time prediction of the resource demand.

According to certain embodiments, an apparatus for real-time prediction of resource consumption by a system. The apparatus includes processing circuitry configured to determine a real-time prediction of resource demand by the system and use GA to dynamically determine an optimal size of a sliding window and an optimal number of predicted data within the real-time prediction of the resource demand. The data within the real-time prediction of the resource demand is adjusted based on an estimated probability of prediction errors and a variable padding. The variable padding is based on a mean of at least one previous standard deviation of the predicted data within the real-time prediction of the resource demand.

Certain embodiments may provide one or more of the following technical advantage(s). For example, certain embodiments may provide a prediction algorithm that may be generic enough to be applied to any system since it is able to provide prediction without any prior knowledge or assumption on the system or on its behavior thanks to the usage of machine learning method and time series. As another example, certain embodiments may be adaptive to the changes that occur in the workload or in the system because it continuously provides the prediction of the future system state after the training phase (machine learning) using the real-time collected data (time series).

As another example, a technical advantage may be that the prediction algorithm may be able to adapt dynamically the size of sliding window and the number of predicted data that minimize under and over estimation. For example, the prediction algorithm may enable dynamic selection of the optimal size of the siding windows and find the optimal number of predated data using Genetic Algorithm (GA).

As still another example, a technical advantage may be that certain embodiments provide a prediction algorithm that may be able to adapt to unexpected workload fluctuations with a relatively short delay.

As still another example, a technical advantage may be that certain embodiments provide a prediction algorithm that includes dynamic adjustment of the resource demand prediction using the estimated probability of the prediction errors and a variable padding.

As yet another example, a technical advantage may be that certain embodiments use Kriging method for dynamic machine learning-based prediction and GA for determining the optimal size of training dataset and the optimal size of predicted data. For example, GA may be used to determine the optimal size of a sliding window for a dataset.

As still another example, a technical advantage may be that certain embodiments use estimated probability of the prediction errors and a variable padding for prediction adjustment.

As still another example, a technical advantage may be that certain embodiments may provide a prediction algorithm that enables dynamic prediction adjustment, wherein, the error-adjustment value that reflects the current tendency for under/over estimation is added to the predicted data. In case of a significant underestimation, particularly more than a giving tolerance threshold (e.g., 10%), a padding may be added to the adjusted predicted data in order to prevent critical under-estimation and SLA violation. The padding value corresponds to the mean of previous standard deviations of observed data aiming to consider workload variability in adjustment process.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 1A and 1B illustrate a table classifying a taxonomy of prediction approaches, according to certain embodiments;

FIG. 4 illustrates a table detailing the characteristics of the example tested scenarios, according to certain embodiments;

FIGS. 6A-6C summarize the evaluation metrics for the defined scenarios, configurations and datasets, according to certain embodiments;

DETAILED DESCRIPTION

Figure 2:
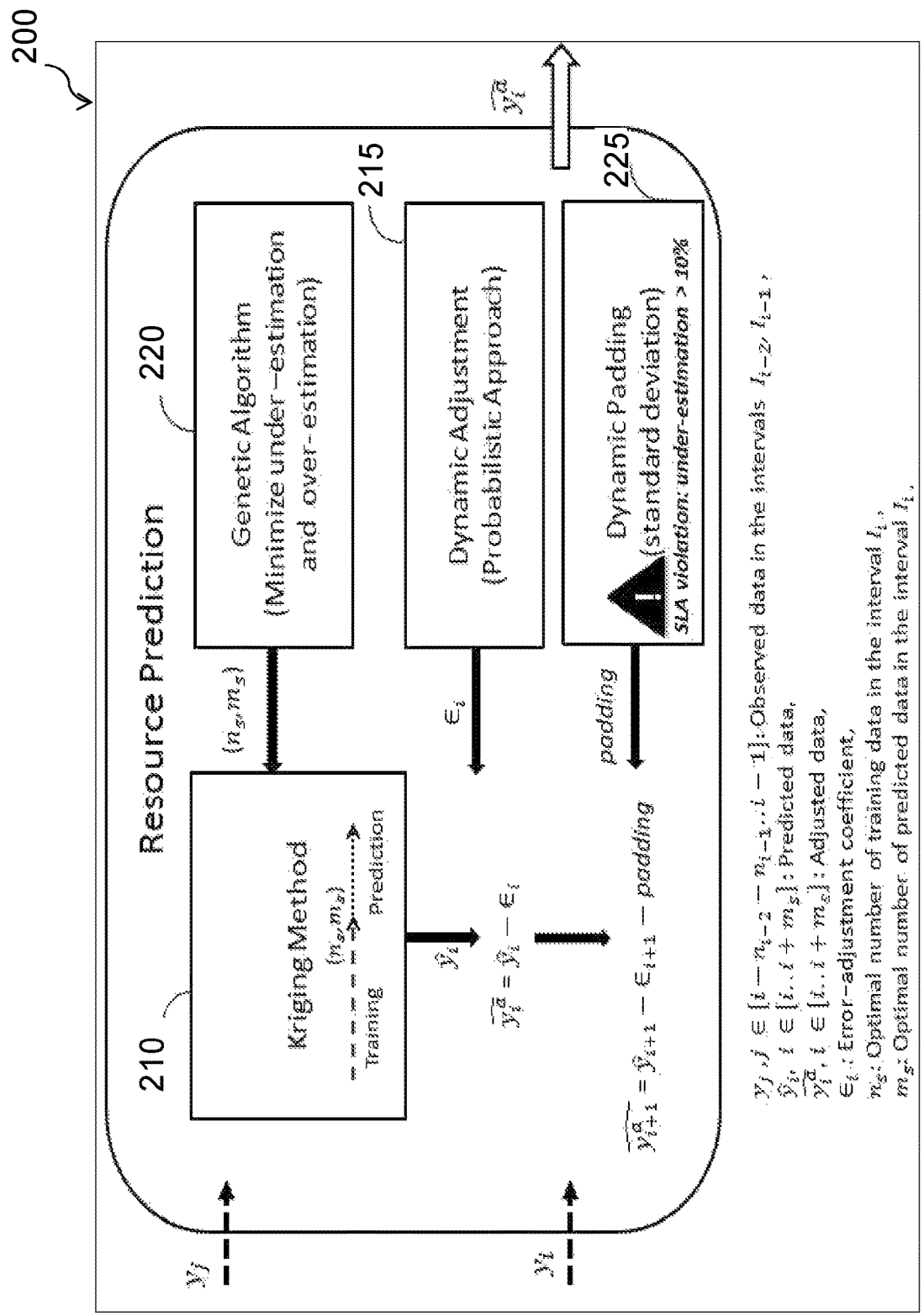
FIG. 2 illustrates the main components of a prediction system and algorithm, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Virtualization is one of the key technologies leveraged to provide scalability, better management flexibility, optimized resource sharing, and lower cost in data centers. To capitalize on this technology, it is essential to provision virtualized systems with resources dynamically according to their workload demands. However, the complexity of virtualized systems and applications, their fluctuating resource demands over time, their dynamic and heterogeneous environments, all impose a real challenge in resource management, which has to optimize resource utilization while avoiding service level agreements (SLA) violation. See, G. K. Shyam and S. S. Manvi, "Virtual resource prediction in cloud environment: A Bayesian approach," *Journal of Network and Computer Applications*, vol. 65, pp. 144-154, 2016.

A common practice is to over-provision resources to meet various SLA requirements established with clients. However, such practice increases the cost incurred in data centers in terms of energy consumption and capital expenditure since more resources have to be available. See, H. Goudarzi and M. Pedram, "Hierarchical SLA-driven resource management for peak power-aware and energy-efficient operation of a cloud datacenter," *IEEE Transactions on Cloud Computing*, vol. 4, no 2, pp. 222-236, 2016. Scalable and elastic allocation of resources is necessary and crucial for dynamic adjustment of resource capacity to the actual demand in real-time, while minimizing SLA violation and delay in resource scaling.

Effective and accurate prediction of resource demands is fundamental to real-time capacity planning and virtualized resource management in data centers. It helps meet the service-level agreement (minimize under-provisioning), anticipate the needs in terms of middleboxes. (e.g., Load Balancer, Firewall) and proactive job scheduling, and consequently improve the usage of resources, the performance of services, and reduce costs (minimize over-provisioning). Several studies have proposed diverse techniques to address these issues; yet, none of them has provided a complete solution. Some of these approaches do not offer proactive and adaptive management of resources or even consider the SLA requirements. Proactive allocation is based on resource demand prediction, where utilization needs are anticipated in advance to be adjusted prior to the occurrence of any change, which is a fundamental requirement in dynamic virtualized systems. Moreover, some of these solutions are environment-specific or application-specific. This limits their accuracy in the case of unexpected and large amounts of data constituting an important drawback in virtualized contexts that exhibit highly dynamic and bursty workloads. See, G. K. Shyam and S. S. Manvi, "Virtual resource prediction in cloud environment: A Bayesian approach," *Journal of Network and Computer Applications*, vol. 65, pp. 144-154, 2016.

To address these limitations, a prediction algorithm is proposed, which is generic enough to be applied to any virtualized system or application, able to dynamically generate and adjust prediction in real time, and offers proactivity to estimate the resource demand anticipating future changes in the system. The disclosed approach provides an algorithm for dynamic, accurate and effective prediction of resource needs by developing and leveraging different methods and techniques. Black-box prediction methods derive models from the system behavior without requiring any knowledge of the system internals. See, A. Gambi. "Kriging-based Self-Adaptive Controllers for the Cloud," PhD thesis, University of Lugano, http://doc.rero.ch/record/32769/files/2012INFO008.pdf, 2013.

The adaptability and the efficiency of these methods make them appropriate for application to virtualized, dynamic and complex environments such as data centers. The proposed algorithm also employs machine learning method and time series to remain a few steps ahead in dynamic estimation of resource needs. Furthermore, as the accuracy of prediction is not always sufficient, adjustments are needed. Therefore, a dynamic adjustment technique is devised and employed in the prediction algorithm to reduce under and over estimation of resources.

Thorough experimentation has been conducted to study the efficiency and the performance of the proposed algorithm and techniques with different systems and workloads. The main contributions of this disclosure are threefold:

Novel algorithm, process, and system for dynamic and multi-step ahead prediction of resource needs in virtualized systems without any prior knowledge or assumptions on their internal behaviors.

Dynamic and adaptive adjustment of prediction based on the estimated probability of prediction errors, and padding strategy to reduce under-estimation (SLA violation) and over-estimation (resource loss) of resource demand.

Dynamic determination of the sizes of the sliding window and the predicted data that minimize under and over-estimations through Genetic Algorithm (GA) intelligence.

Specifically, according to certain embodiments, in order to realize generic, dynamic and adaptive prediction of resource consumption in virtualized systems, a prediction algorithm is proposed. Without any prior knowledge or assumption on the system or on its behavior, the algorithm aims to estimate accurately the resource demand and to minimize both service level agreement (SLA) violation and resource loss. None of the previous approaches and techniques use the combination proposed herein. Specifically, none of the previous approaches and techniques use: (1) Kriging method combined with Genetic Algorithm (GA) for predicting data and adapting the size of sliding window and number of predicted data dynamically, and (2) an adjustment of prediction based on estimated probability of the prediction errors, and mean of standard deviation-based padding.

The prediction algorithm is generic enough to be applied to any virtualized system, is able to dynamically generate and adjust prediction in real time, and may anticipate future changes in the system. In order to achieve the aforementioned objectives, the present invention comprises the following three aspects:

(1) The first aspect leverages the Kriging method for dynamic machine learning-based prediction. Kriging is a spatial interpolation procedure that uses statistical methods for prediction. It is able to model a system based on its external behavior and generic data. It is also characterized by its adaptability to linear, non-linear and multi-modal behavior of the system. According to certain embodiments, the Kriging method may be adapted in order to provide real-time adaptive and dynamic prediction of resource consumption.

(2) The second aspect considers the input of the algorithm, namely, the resource utilization data collected from the system, as a time series with a variable sliding window length and a variable size of predicted data. This technique is enhanced using the GA to dynamically generate the optimal size of the sliding window and the optimal number of predicted data, in order to minimize the prediction errors of under and over estimation. This aspect enables dynamic processing of the collected data to provide prediction based on most recent data reflecting the current system state.

(3) The third aspect consists of the adjustment of the prediction based on the estimated probability of prediction error and a variable padding. Specifically, adaptive padding and reactive error adjustment reduce under-estimations and over-estimations of resource demands to minimize SLA violation, and resource loss due to typical over-allocation of resources. According to this aspect, the adjustment of the prediction aims to improve the efficiency of prediction and mitigate under-estimation caused by significant changes in the workload. Each time a prediction is made, the estimated probabilities of the two previous error intervals are compared along with the error indicators to determine the error-adjustment coefficient that reflects the current tendency for under/over estimation. Thus, prediction adjustment is performed by adding the error-adjustment coefficient to predicted data. Additionally, the adjustment of prediction may be improved by a variable padding in case of significant under-estimation, particularly for under-estimation more than a given tolerance threshold (e.g., 10%). Finally, the padding value is computed based on the mean of previous standard deviations of observed data. Then it is added to the adjusted predicted data in the next prediction to address, quickly, the gap between the observed data and the predicted data, and thus, to prevent a long duration of under-estimation and SLA violation.

The application scope of the techniques disclosed herein is not limited to virtualized systems; it may be extended to any monitored system that is able to provide data on its state.

Therefore, as discussed above, the proposed prediction algorithm involves three main techniques. The first technique leverages the Kriging method for dynamic machine-learning-based prediction. The second technique is to apply the Genetic Algorithm (GA) to dynamically provide the optimal size of the sliding window and the optimal number of predicted data, helping to minimize the prediction errors of under and over-estimation. Finally, the third technique adjusts the prediction of resource demand based on the estimated probability of the prediction errors and a variable padding.

In comparison with the existing approaches, the prediction algorithm approach described herein differs in many aspects, providing a generic, dynamic, and self-adaptive solution for resource prediction. Indeed, it is proposed to use dynamic selection of the optimal size of the sliding window (data used for training phase) and the optimal number of predicted data using Genetic Algorithm and Kriging method for dynamic machine learning-based prediction. The existing approaches create training data sets by re-sampling with replacement from the original training or determine the best fit predictive model by using Genetic algorithms for training phase or by optimizing linear regression coefficients. However, we propose a prediction adjustment using estimated probability of the prediction errors and a variable padding, while previous adjustment approaches are based, either on aggregated search results or on predicted operating condition and measurements' data.

The rest of this disclosure is organized as follows. First, the state of the art related to the resource demand prediction in the context of resource management of virtualized systems is reviewed. Second, a proposed approach, algorithm, methods, and strategies are explained. Third, the performance of the prediction algorithm is evaluated. Finally, the main results are analyzed.

With regard to the state of the art, resource management of virtualized systems has become an attractive research area recently, and several techniques have been proposed in this regard. Below, existing work on the techniques used in this domain are studied. To highlight contributions made in this disclosure, specifically, FIGS. 1A and 1B illustrate a table classifying the following recent approaches:

A. G. K. Shyam and S. S. Manvi, "Virtual resource prediction in cloud environment: A Bayesian approach," *Journal of Network and Computer Applications*, vol. 65, pp. 144-154, 2016.

B. P. K Hoong, I. K. Tan and C. Y. Keong, "Bittorrent Network Traffic Forecasting With ARMA". *International Journal of Computer Networks & Communications*, vol. 4, no 4, pp. 143-.156, 2012.

C. M. F. Iqbal and L. K John, "Power and performance analysis of network traffic prediction techniques," *Performance Analysis of Systems and Software (ISPASS)*, 2012 IEEE International Symposium, IEEE, 2012, pp. 112-113.

D. W. Lloyd, S. Pallickara, O. David, J. Lyon, M. Arabi and K. Rojas, "Performance implications of multi-tier application deployments on Infrastructure-as-a-Service clouds: Towards performance modeling," *Future Generation Computer Systems*, vol. 29, no 5, pp. 1254-1264, 2013.

E. J. Liang, J. Cao, J. Wang and Y. Xu, "Long-term CPU load prediction," *Dependable, Autonomic and Secure Computing (DASC)*, 2011 *IEEE Ninth International Conference*, 2011, pp. 23-26, IEEE.

F. R. Hu, J. Jiang, G. Liu and L. Wang, "CPU Load Prediction Using Support Vector Regression and Kalman Smoother for Cloud," *Distributed Computing Systems Workshops (ICDCSW)*, 2013 *IEEE 33rd International Conference*, 2013, pp. 88-92, IEEE.

G. A. Gambi M. Pezzè and G. Toffetti, "Kriging-based self-adaptive cloud controllers," *IEEE Transactions on Services Computing*, vol. 9, no 3, pp. 368-381, 2016.

FIG. 1 also compares these recent approaches to the techniquest disclosed herein. The comparisons are based on key features needed for efficient prediction of resources in virtualized systems.

Time series is a collection of observations made chronologically, characterized by its large data size, high dimensionality and continuous update. See, T. Fu, "A review on time series data mining," *Engineering Applications of Artificial Intelligence*, vol. 24, no 1, pp. 164-181, 2011. In his review, Fu has categorized the time series data into representation and indexing, similarity measure, segmentation, visualization and mining. He also considered the similarity measure and segmentation as the core tasks for various time series mining tasks. To analyze the time series data, various methods and techniques have been used, namely, Support Vector Regression, auto-regression, Expectation Maximization Algorithm, hidden Markov models, and Fourier, transforms. When it comes to the segmentation of time series into subsequences for preprocessing or trend analysis, an important observation has proved the effectiveness of a dynamic approach that uses variable window size, rather than a fixed one, to flexibly identify the time points.

In the same context, other studies have revealed that the input window size impacted the prediction model accuracy, which has been improved by the use of the sliding window strategy. See, S. Islam, J. Keung, K. Lee and A. Liu, "Empirical prediction models for adaptive resource provisioning in the cloud," *Future Generation Computer Systems*, vol. 28, pp. 155-162, 2012; See also, D. Tran, N. Tran, B. M. Nguyen and H. Le, "PD-GABP—A novel prediction model applying for elastic applications in distributed environment," *Information and Computer Science (NICS)*, 2016 *3rd National Foundation for Science and Technology Development Conference*, IEEE, 2016, pp. 240-245. Contrary to all historical data, the sliding window enables the prediction models to follow the trend of recently observed data and the underlying pattern within the neighborhood of the predicted data. Therefore, it allows achieving more accurate prediction.

Prediction approaches can be mainly categorized into two classes. The first category is based on models deduced from the system behavior analysis. Existing studies based on such analytical models focus mainly on auto-regression and moving averages (See, P. K Hoong, I. K. Tan and C. Y. Keong, "Bittorrent Network Traffic Forecasting With ARMA," *International Journal of Computer Networks & Communications*, vol. 4, no 4, pp. 143-.156, 2012; See also, Y. Yu, M. Song, Z. Ren, and J. Song, "Network Traffic Analysis and Prediction Based on APM," *Pervasive Computing and Applications (ICPCA)*, 2011, pp. 275-280, IEEE; See also, M. F. Iqbal and L. K John, "Power and performance analysis of network traffic prediction techniques," *Performance Analysis of Systems and Software (ISPASS)*, 2012 *IEEE International Symposium*, IEEE, 2012, pp. 112-113), multiple linear regression (See, W. Lloyd, S. Pallickara, O. David, J. Lyon, M. Arabi and K. Rojas, "Performance implications of multi-tier application deployments on Infrastructure-as-a-Service clouds: Towards performance modeling," *Future Generation Computer Systems*, vol. 29, no 5, pp. 1254-1264, 2013), Fourier transform and tendency-based methods (See, J. Liang, J. Cao, J. Wang and Y. Xu, "Long-term CPU load prediction," *Dependable, Autonomic and Secure Computing (DASC)*, 2011 *IEEE Ninth International Conference*, 2011, pp. 23-26, IEEE; See also, A. Gandhi, Y. Chen, D. Gmach, M. Arlitt and M. Marwah, "Minimizing data center sla violations and power consumption via hybrid resource provisioning," *Green Computing Conference and Workshops (IGCC)*, 2011 *International*, IEEE, 2011, pp. 1-8), and cumulative distribution function (See, H. Goudarzi and M. Pedram, "Hierarchical SLA-driven resource management for peak power-aware and energy-efficient operation of a cloud datacenter," *IEEE Transactions on Cloud Computing*, vol. 4, no 2, pp. 222-236, 2016). Specifically, researchers have evaluated the relationships between resource utilization (CPU, disk and network) and performance using multiple linear regression technique, to develop a model that predicts application deployment performance. See, W. Lloyd, S. Pallickara, O. David, J. Lyon, M. Arabi and K. Rojas, "Performance implications of multi-tier application deployments on Infrastructure-as-a-Service clouds: Towards performance modeling," *Future Generation Computer Systems*, vol. 29, no 5, pp. 1254-1264, 2013. Their model accounted for 84% of the variance in predicting the performance of component deployments.

However, all these models are static and non-adaptive to unexpected changes in the system behavior or in its environment. This is due to their use of configuration-specific variables in the model. On the other hand, the second category of resource prediction approaches is based on online processing of the data through machine-learning techniques. Such approach is dynamic and adaptive yet less accurate when compared to the model-based approaches as it may be affected by the non-reliability of the data measurement tools, which may lead to erroneous values.

To achieve both dynamic and more accurate prediction, recent researches have proposed combining both approaches in hybrid solutions. See, A. Gambi. "Kriging-based Self-Adaptive Controllers for the Cloud," PhD thesis, University of Lugano, http://doc.rero.ch/record/32769/files/2012INFO008.pdf, 2013; See also, M. Amiri and L. Mohammad-Khanli, "Survey on prediction models of applications for resources provisioning in cloud," *Journal of Network and Computer Applications*, vol. 82, pp. 93-113, 2017. Multiple studies have proposed machine learning methods for dynamic prediction of the resource usage, including Kalman filter (See, D. Zhang-Jian, C. Lee and R. Hwang, "An energy-saving algorithm for cloud resource management using a Kalman filter," *International Journal of Communications Systems*, vol. 27, no 12, pp. 4078-4091, 2013; See also, W. Wang et al., "Application-level cpu consumption estimation: Towards performance isolation of multi-tenancy web applications," 2012 *IEEE 5th International Conference on Cloud computing*, IEEE, 2012, pp. 439-446), Support Vector Regression (SVR) (See, R. Hu, J. Jiang, G. Liu and L. Wang, "CPU Load Prediction Using Support Vector Regression and Kalman Smoother for Cloud," *Distributed Computing Systems Workshops (ICDCSW)*, 2013 *IEEE 33rd International Conference*, 2013, pp. 88-92, IEEE; See also, C. J Huang et al, "An adaptive resource management scheme in cloud computing," *Engineering Applications of Artificial Intelligence*, vol. 26, no 1, pp. 382-389, 2013; See also, Z. Wei, T. Tao, D. ZhuoShu and E. Zio, "A dynamic particle filter-support vector regression method for reliability prediction," *Reliability Engineering & System Safety*, vol. 119, pp. 109-116, 2013), Artificial Neural Network (ANN) (See, S. Islam, J. Keung, K. Lee and A. Liu, "Empirical prediction models for adaptive resource provisioning in the cloud," *Future Generation Computer Systems*, vol. 28, pp. 155-162, 2012; See also, D. Tran, N. Tran, B. M. Nguyen and H. Le, "PD-GABP—A novel prediction model applying for elastic applications in distributed environment," *Information and Computer Science (NICS)*, 2016 *3rd National Foundation for Science and Technology Development Conference*, IEEE, 2016, pp. 240-245; See also, K. Ma et al. "Spendthrift: Machine learning based resource and frequency scaling for ambient energy harvesting nonvolatile processors," Design Automation Conference (ASP-DAC), 2017 22nd Asia and South Pacific, IEEE, 2017, pp. 678-683), and Bayesian models (See, G. K. Shyam and S. S. Manvi, "Virtual resource prediction in cloud environment: A Bayesian approach," *Journal of Network and Computer Applications*, vol. 65, pp. 144-154, 2016). The authors in the latter proposed a Bayesian model to determine short and long-term virtual resource requirement of applications on the basis of workload patterns, at several data centers, during multiple time intervals. The proposed model was compared with other existing work based on linear regression and support vector regression, and the results showed better performance for Bayesian model in terms of mean squared error. Nevertheless, as the proposed model is based on workload patterns generated from resource usage information during weekdays and weekends, it may be unable to respond to quick and unexpected changes in the resource demands.

Researchers have suggested multi-step-ahead CPU load prediction method based on SVR and integrated Smooth Kalman Filter to further reduce the prediction error (KSSVR). See, R. Hu, J. Jiang, G. Liu and L. Wang, "CPU Load Prediction Using Support Vector Regression and Kalman Smoother for Cloud," *Distributed Computing Systems Workshops (ICDCSW)*, 2013 *IEEE 33rd International Conference*, 2013, pp. 88-92 IEEE. The results of their experiments showed that KSSVR had the best prediction accuracy, followed successively by standard SVR, Back-Propagation Neural Network (BPNN), and then Autoregressive model (AR). Yet, with small and fixed size of training data, the prediction accuracy of KSSVR has decreased, mainly when CPU load data have been collected from heavily loaded and highly variable interactive machines.

Gambi et al. have proposed self-adaptive cloud controllers, which are schedulers that allocate resources to applications running in the cloud based on Kriging models in order to meet the quality of service requirements while optimizing execution costs. See, A. Gambi M. Pezzè and G. Toffetti, "Kriging-based self-adaptive cloud controllers," *IEEE Transactions on Services Computing*, vol. 9, no 3, pp. 368-381, 2016. Kriging models were used to approximate the complex and a-priori unknown relationships between: (1) the non-functional system properties collected with runtime monitors (e.g., availability, and throughput), (2) the system configuration (e.g., number of virtual machines), and (3) the service environmental conditions (e.g., workload intensity, interferences). Their test results have confirmed that Kriging outperforms multidimensional linear regression, multivariate adaptive regression splines and Queuing models. However, the relatively poor performance of controllers using pure Kriging models revealed that the performance of Kriging-based controllers increases with the availability of a larger set of training values.

To avoid under-estimation of resource needs, a prediction adjustment has been proposed in several studies. The adjustment was introduced as a padding to be added to the predicted data as a cap of prediction. This padding was prefixed (e.g., 5%) or calculated dynamically using various strategies. See, K. Qazi, Y. Li and A. Sohn, "Workload Prediction of Virtual Machines for Harnessing Data Center Resources," *Cloud Computing (CLOUD)*, 2014 *IEEE 7th International Conference*, IEEE, 2014, pp. 522-529. The latter include measuring the relationship between the padding value and the confidence interval, which is defined as the probability that real demand is less than the cap (See, J. Jiang, J. Lu, Zhang and G. Long, "Optimal cloud resource auto-scaling for web applications," *Cluster, Cloud and Grid Computing (CCGrid)*, 2013 *13th IEEE/ACM International Symposium*, IEEE, 2013, pp. 58-65), or considering the maximum of the recent burstiness of application resource consumption using fast Fourier transform and recent prediction errors through weighted moving average (See, Z. Shen, S. Subbiah, X. Gu and J. Wilkes, "Cloudscale: elastic resource scaling for multi-tenant cloud systems," *Proceedings of the 2nd ACM Symposium on Cloud Computing, ACM* 2011, p. 5), or using the confidence interval based on the estimated standard deviation for the prediction errors (See, J. Liu, H. Shen and L. Chen, "CORP: Cooperative opportunistic resource provisioning for short-lived jobs in cloud systems," *Cluster Computing (CLUSTER)*, 2016 *IEEE International Conference*, IEEE, 2016, pp. 90-99).

The time and effort needed to build analytical models (off-line modeling) limit their usefulness in dynamic and real-time applications despite their accuracy. See, Z. Wei, T. Tao, D. ZhuoShu and E. Zio, "A dynamic particle filter-support vector regression method for reliability prediction," *Reliability Engineering & System Safety*, vol. 119, pp. 109-116, 2013. Based on historical observed data, these models are not able to capture the behavioral changes in the applications or the systems. Furthermore, techniques based on threshold rules that assume linearity and stability in the system behavior, are not realistic solutions in the light of the complexity and the unpredictable behavior of the current systems, as well as their internal and external interactions. See, A. Gambi M. Pezzè and G. Toffetti, "Kriging-based self-adaptive cloud controllers," *IEEE Transactions on Services Computing*, vol. 9, no 3, pp. 368-381, 2016. Furthermore, being application-specific, these solutions lack the ability to adapt to cloud dynamics, because their models are generated based on the analysis of a specific application or system for given environment and behavior. In contrast, data-driven approaches relying on machine learning methods are able to outperform the analytical models and adapt to changes by deriving models from the system behavior without requiring any knowledge of the system internals. Yet, existing resource prediction models in the cloud consider an excessive allocation of resources in order to avoid SLA violation in case of peak demands. See, G. K. Shyam and S. S. Manvi, "Virtual resource prediction in cloud environment: A Bayesian approach," *Journal of Network and Computer Applications*, vol. 65, pp. 144-154, 2016. This leads to a waste of resources and energy, and increases the operating costs. The table illustrated in FIGS. 1A-1B provides the taxonomy of the most recent relevant approaches in these contexts.

In comparison with the studies in literature, the approach disclosed herein differs in many aspects, providing a generic, dynamic, and self-adaptive solution for resource prediction. In this proposition, black-box techniques are leveraged to provide a generic solution, which can be applied to any system with no assumptions or knowledge of the systems' internal functionalities being required. An adaptive solution is also provided to accommodate the changes in observed data, through real-time data analysis. Moreover, a solution is provided with multi-step ahead prediction of resource demand by leveraging the Kriging machine learning method and time series, and proposing dynamic sliding window technique. Further, dynamic adaptive padding and reactive error adjustment are able to mitigate under-estimations and over-estimations of resources to reduce SLA violation and reduce resource loss due to typical excessive allocation of resources.

More specifically, according to certain embodiments, a generic, dynamic, and self-adaptive prediction of the resource needs in virtualized systems is proposed. The proposition aims to minimize under-estimation, which can lead to possible SLA violation, and reduce over-estimation that causes loss of resources, without any prior knowledge of the system or any assumption on its behavior or load profile. Towards that end, a novel prediction algorithm is proposed that involves three main techniques. The first technique leverages Kriging method for dynamic machine learning-based prediction. The second technique considers the input of the algorithm, namely, the resource utilization data collected from the system, as a time series with a variable sliding window and a variable size of predicted data. This technique benefits from Genetic Algorithm (GA) to dynamically provide the optimal size of the sliding window and the optimal number of predicted data, helping to minimize the prediction errors of under and over estimation. This enables our algorithm to process the data dynamically and provide the prediction based on the most recent data that reflect the current system state. Finally, the third technique adjusts the prediction based on the estimated probability of the prediction errors and a variable padding.

FIG. 2 is a block diagram showing the main components of prediction algorithm 200 according to a particular embodiment. The prediction of a case of time-series data of the resource consumption in virtualized systems will be described as an example.

According to certain embodiments, the prediction algorithm 200 begins by reading collected resource consumption data ($y_j$). Further, it initializes the size of the sliding window ($n_i$) and the number of predicted data ($m_i$) to their maximums, while the error-adjustment coefficient and the padding values are set to zero. Then, an initialization phase is performed. It consists of consecutive training and prediction ($\hat{y}_i$) based on the Kriging method (step 210), gathering sufficient data (named historical data) to apply adjustment and optimization in next prediction steps.

Based on the historical data, the prediction (step 210) and its adjustment (step 215) are applied for each pair ($n_i$, $m_i$) of the set of all possible combinations of $n_i$, $m_i$ values. The obtained results are used by the Genetic Algorithm (step 220) to determine the optimal sizes for sliding window and prediction ($n_s$, $m_s$) that minimize under-estimation and over-estimation.

Using the optimal pair ($n_s$, $m_s$), the prediction of upcoming resource consumption is performed based on the Kriging method (step 210) as well as its adjustment (step 215) according to the two previous error-adjustment values. Then, the adjusted predicted data that estimate the future resource consumption are provided ($\widehat{y_t^a}$).

Once the first observed data is collected ($y_i$), it is compared to its corresponding adjusted predicted data ($\widehat{y_t^a}$). If under-estimation is more than a giving threshold above which under-estimation is not tolerated (e.g., 10%, threshold defined based on empirical study), the padding value is evaluated (step 225) and the processes of prediction-adjustment are restarted taking padding into account. Otherwise, the observed data is gathered for the next prediction step.

The prediction algorithm continues repeatedly to estimate the resource consumption while the system is monitored and its relevant data are collected.

The components illustrated in FIG. 2 will now be described in more detail. Table 1 describes the notations and the symbols used herein.

TABLE I

TERMS, DEFINITIONs& SYMBOLS/ACRONYMS

| Symbol/ Acronym | Definition |
|---|---|
| $y_i$ | Observed data |
| $\hat{y}_i$ | Predicted data |
| $\widehat{y_t^a}$ | Adjusted data |
| $e_i$ | Error of the $i^{th}$ prediction: $e_i = \hat{y}_i - y_i$ |
| X | Continuous random variable that represents the observed error $e_i$ |
| I | Interval of errors $I = [e_{min}, e_{max}]$ for each prediction step |
| PDF | Probability Density Function (e.g., Normal, non-parametric) |
| $Pr(x \in I)$ | Probability that X is in the interval I. |
| $I_{proba}$ | Interval of probability (e.g., $I_{Proba} = [0, 0.1[$) |
| $\in_i$ | Error-adjustment coefficient (e.g., min or max of errors) in the interval $I_i$ |
| l | Number of sliding windows |
| $n_{oe}$ | Number of over-estimation |
| $n_{ue}$ | Number of under-estimation |
| $\alpha_i$ | Indicates whether a padding is added or not |
| $\beta_i$ | Indicates whether there is an over-estimation or not |
| $\gamma_i$ | Indicates whether the size of sliding window is applicable or not |
| $m_i$ | Number of predicted data in the interval $I_i$ |
| $n_i$ | Number of observed data within a sliding window used for training data in the interval $I_i$ |
| $n_s$ | Optimal number of training data in the interval $I_i$ |
| $m_s$ | Optimal number of predicted data in the interval $I_i$ |
| r | rounded ratio between the observed and the adjusted data: $r = \lceil y_i/\widehat{y_t^a} \rceil$ |
| $\sigma_j$ | Standard deviation: $\sqrt{\frac{1}{n-1}\sum_{i=1}^{n}(y_i - \bar{y})^2}$ of the $j^{th}$ under-estimation if it is less than $-10\%$ |
| $\bar{y}$ | $\bar{y} = \frac{1}{n}\sum_{i=1}^{n} y_i$ |
| $Pr_{UnderEstim}^{PredictData}$ | Probability of under-estimation for predicted data: $\frac{\text{number of underestimation in predicted data}}{\text{number of predicted data}}$ |
| $Pr_{UnderEstim}^{AdjustData}$ | Probability of under-estimation for adjusted data: $\frac{\text{number of underestimation in adjusted data}}{\text{number of adjusted data}}$ |

TABLE I-continued

TERMS, DEFINITIONs & SYMBOLS/ACRONYMS

| Symbol/Acronym | Definition |
|---|---|
| $E_{OverEstim}^{PredictData}$ | Mean of over-estimation for predicted data: $$\frac{1}{n_{oe}} \sum_{i=1}^{n} (\hat{y}_i - y_i)$$ |
| $E_{OverEstim}^{AdjustData}$ | Mean of over-estimation for adjusted data: $$\frac{1}{n_{oe}} \sum_{i=1}^{n} (\widehat{y_t^a} - y_i)$$ |
| $E_{OverEstim}^{Thres}$ | Mean of over-estimation for static provisioning (threshold-based provisioning) $$E_{OverEstim}^{Thres} = \frac{1}{n_{oe}} \sum_{i=1}^{n} (Thres - y_i)$$ |
| Thres | It is an over-provisioning of resources in legacy networks. It represents the maximum allocated resources for a specific system) and load profile. |
| $uptime_i$ | The $i^{th}$ uptime moment where there is no under-estimation. |
| $downtime_i$ | The $i^{th}$ downtime moment where there is an under-estimation after the $i^{th}$ uptime moment. |
| MTBUE | Mean Time BetweenUnder-Estimation: $$\frac{\sum_{i=1}^{n} (uptime_i - downtime_i)}{\text{number of under} - \text{estimations}}$$ |
| CPS | Call Per Second | historical data) to apply adjustment and optimization techniques. The prediction and its adjustment are applied based on the historical data for each pair $(n_i, m_i)$ within the set of all possible combinations of $n_i$, $m_i$ values (Line 6 to Line 10). The obtained results, which form the adjusted predicted data and their corresponding combination of $(n_i, m_i)$, are used by the Genetic Algorithm (Algorithm 4) to determine the optimal sizes for sliding window and prediction $(n_s, m_s)$ that minimize under-estimation and over-estimation (Line 11). Having determined the optimal pair $(n_s, m_s)$, the prediction of upcoming resource consumption is performed based on the Kriging method (Line 12) as well as its adjustment (Line 13) according to the two previous error-adjustment values (Algorithm 2). When the first observed data is collected, it is compared to its corresponding adjusted predicted data. If under-estimation is more than 10%, a threshold that we defined based on empirical study, above which under-estimation is not tolerated, the padding value is evaluated (Algorithm 3) and the processes of prediction-adjustment are resumed taking padding into account. Otherwise, the observed data is gathered for the next prediction step (Line 18). Our online prediction process continues repeatedly to estimate the resource consumption while the system is monitored and its relevant data are collected.

The time complexity of proposed algorithm for resource consumption prediction depends essentially on three parts: (1) the time taken by the Kriging method to train and predict the next resource demand, (2) the time complexity of adjustment and padding, and (3) the time complexity of GA to provide the optimal sizes of the sliding window and the number of predicted data $(n_s, m_s)$. The time complexities of each technique of our algorithm, namely, the Kriging method, adjustment, padding and GA are evaluated below.

In Algorithm 1, the initialization of parameters (the sliding window size, the number of predicted data, the error- Algorithm 1 for resource consumption prediction (y, n, m) presents an example approach for resource needs prediction:

```
1:   (n_i, m_i) := (max ({n_i }), max ({m_i}))
2:   Initialize error-adjustment coefficient ∈_{i-1} :=, ∈_{i-2} := 0
3:   Initialize padding:=0
4:   Collect observed data: y_i , i ∈ [1..n_i]
5:   Initialization Phase (n_i, m_i)
6:   for each collected data window
7:       for each (n_i, m_i)
8:           Predict historical data (ŷ_i, n_i, m_i ) = Kriging (y_i, n_i, m_i)
9:           Adjust historical data (ŷ_t^a, n_i, m_i ) = Algorithm 2 (ŷ_i, I_{i-2}, I_{i-1}, ∈_{i-1}, ∈_{i-2})
10:      end for
11:      Genetic Algorithm (n_s, m_s) = Algorithm 4 (ŷ_t^a,{(n_i, m_i)})
12:      Predict next data (ŷ_i , n_s, m_s)= Kriging (y_i, n_s, m_s)
13:      (ŷ_t^a, n_s, m_s, ∈_{i-1}, ∈_{i-2}) = Algorithm 2 (ŷ_i, I_{i-2}, I_{i-1}, ∈_{i-1}, ∈_{i-2})
14:      Collect observed data: y_i
15:      padding:= Algorithm 3 (ŷ_t^a, y_i, n_s, m_s, threshold)
16:      return the adjusted prediction of resource utilization ŷ_t^a
17:      if (padding = =0)
18:          Collect observed data: y_i , 1 ∈ [i + 1..i − 1 + m_s]
19:      else
20:          Go to step 7
21:      end
22: end for
```

The algorithm starts by initializing the size of the sliding window and the number of predicted data $(n_i, m_i)$ to their maximums, while the error-adjustment coefficient and the padding values are set to zero (Line 1 to Line 4). After collecting data, an initialization phase (Line 5) is performed. It consists of consecutive training and prediction steps based on the Kriging method, gathering sufficient data (named adjustment value, the padding value) as well as the data collection (Line1-Line4) have time complexity O(1). During the initialization phase (Line 5), several training and prediction steps using Kriging method are performed with the time complexity of $O(k\, m_i\, n_i^3)$ where k is the number of repetitions used to collect sufficient data for adjustment and optimization. Then, the assessment of the optimal $(n_s, m_s)$ is performed using GA (Line 11) based on the results of the prediction and adjustment of the historical data (Line 7-10). These two steps have time complexity of O(IPL), and O(P $m_i$ $n_i^3$)+O(PN$_1$), respectively, where P is the size of the population of ($n_i$, $m_i$). The prediction (Line 12), adjustment of upcoming data (Line 13), and padding (Line 15) have time complexities of O($m_s$ $n_s^3$), O(N$_1$), and O($n_s$), respectively. Finally, data collection, evaluating padding values and providing the estimation of resource needs for the next time slot have the time complexity of O(1). Consequently, the time complexity of Algorithm 1 is O(1)+O(k $m_i$ $n_i^3$)+O(P $m_i$ $n_i^3$)+O(PN$_1$)+O(IPL)+O($m_s$ $n_s^3$)+O(N$_1$)+O(1)+O($n_s$)+O (1) which is equivalent to O(P $m_i$ $n_i^3$) due to the highest order of $n_i^3$.

With regard to prediction, Kriging is a spatial interpolation procedure that uses statistical methods for prediction. It assumes a spatial correlation between observed data. See, D. G. Krige. "A Statistical Approach to Some Basic Mine Valuation Problems on the Witwatersrand," *Journal of the Southern African Institute of Mining and Metallurgy*, vol. 52, no. 6, pp. 119-139, 1951; See also, G. Matheron. "Principles of Geostatistics," *Economic Geology*, vol. 58 no. 8, pp. 1246-1266, 1963. In other words, observed data close to each other in the input space are assumed to have similar output values. See, A. Gambi M. Pezzè and G. Toffetti, "Kriging-based self-adaptive cloud controllers," *IEEE Transactions on Services Computing*, vol. 9, no 3, pp. 368-381, 2016. Kriging is able to model a system based on its external behavior (black-box model) and generic data. It also provides adaptability to linear, non-linear and multi-modal behavior of the system (i.e., runtime training) with a complexity that varies with the number of samples used for the model fitting. These characteristics are exactly what make Kriging method suitable for online adaptive and dynamic prediction, which has also been proved in the literature. According to certain embodiments described herein, however, Kriging is adapted in order to provide dynamic and adaptive prediction of resource consumption. In what follows, the proposed method is explained.

By means of interpolation, the method predicts the unknown value $\hat{y}_p$ by computing weighted linear combinations of the available samples of observed data $y_i$ in the neighborhood, given in Equation 1:

$$\widehat{y_p} = \Sigma_{i=1}^n \omega_i y_i \quad \text{(Equation 1)}$$

where $\omega_i$ is the weight associated with the estimation, and $\Sigma_{i=1}^n \omega_i = 1$. See, W. C. M. van Beers and J. P. C. Kleijnen, "Kriging interpolation in simulation: a survey," *Proceedings of the* 2004 *Winter Simulation Conference*, vol. 1, pp. 121, IEEE, 2004.

To quantify the weight $\omega_i$ for each observed data (Equation 1), the method determines the degree of similarity between the observed data $y_i$, from the covariance value, according to the distance between them, using the semivariogram $\gamma(h)$ given by:

$$\gamma(h) = \frac{1}{2N(h)} \sum_{i=1}^{N(h)} (y_i - y_j)^2 \quad \text{(Equation 2)}$$

where N(h) is the number of all pairs of sample points ($y_i$, $y_j$) (i.e., observed data) separated by the distance h. See, Y. Gratton. "Le krigeage: La méthode optimale d'interpolation spatiale," *Les articles de l'Institut d'Analyse Géographique*, https://cours.etsmtl.ca/sys866/Cours/documents/krigeage_juillet2002.pdf, 2002; See also, G. Liu et al."An indicator kriging method for distributed estimation in wireless sensor networks," *International Journal of Communication Systems*, vol. 27, no 1, pp. 68-80, 2014.

The empirical semivariogram allows to derive a semivariogram model (e.g., Spherical, Gaussian, Exponential) to represent semi variance as a function of separation distance. The semivariogram model is used to define the weights $\omega_i$ and to evaluate the interpolated points (i.e., predicted data). Hence, the weights $\omega_i$ are obtained by resolving the following linear equation system:

$$\begin{bmatrix} A & 1 \\ 1^T & 0 \end{bmatrix} \begin{bmatrix} \vec{\omega} \\ \mu \end{bmatrix} = \begin{bmatrix} B \\ 1 \end{bmatrix} \quad \text{(Equation 3)}$$

with $A_{ij} = \gamma(h_{ij})$ is a value of semivariogram corresponding to distance $h_{ij}$ between $y_i$ and $y_j$, $B_{ip} = \gamma(h_{ip})$ is the value of semivariogram to be calculated according to the distance $h_{ip}$ between $y_i$ and $y_p$ (point to estimate), $\vec{\omega} = [\omega_1, \ldots, \omega_n]^T$ the weight vector, and $\mu$ is the Lagrange multiplier.

Finally, the calculated weights are used in Equation 1 to estimate $y_p$.

According to certain embodiments proposed herein, the Kriging method is used to provide prediction of next $m_i$ values of CPU consumption ($\widehat{y_p}$ in Equation (1)) using $n_i$ observed values of CPU consumption ($y_i$ in Equation (1)) as training data. To predict the value of resource demand for a given time slot, the method determines the weights of observed data (i.e., training data) by solving the linear system in Equation (3), which has a time complexity of O($n_s^3$) with $n_s$ being the number of training data. See, B. V Srinivasan, R. Duraiswami, and R. Murtugudde. "*Efficient kriging for real-time spatio-temporal interpolation Linear kriging,*" 20*th Conference on Probablility and Statistics in Atmospheric Sciences,* 2008, pp 1-8. Hence, at each prediction phase, this kriging method has a time complexity of O($m_s$ $n_s^3$), with $m_s$ is number of predicted values. A complexity of O($m_s$ $n_s^3$) is acceptable as the size of the sliding window (training data) and the number of the predicted data are variable and relatively small values of these parameters are needed in order to closely track the system behavior.

To improve the efficiency of the prediction method and reduce the under-estimation caused by significant changes in the resource demands, a dynamic prediction adjustment strategy is proposed. The dynamic prediction adjustment strategy is based on the estimated probability of the prediction errors and a variable padding technique.

Algorithm 2 provides the adjustment of the prediction ( $\hat{y}$, $I_{i-2}$, $I_{i-1}$, $\in_{i-1}$, $\in_{i-2}$, $_i$):

1: Compute $Pr_{i-2}$ (x $\in$ $I_{i-2}$) and $Pr_{i-1}$(x $\in$ $I_{i-1}$)
2: if {$Pr_{i-1}$(x $\in$ $I_{i-1}$), $Pr_{i-2}$(x $\in$ $I_{i-2}$)} $\in$ $I_{Proba}$ and sign($\in_{i-1}$) = sign($\in_{i-2}$)

-continued

Algorithm 2 provides the adjustment of the prediction ($\hat{y}$, $I_{i-2}$, $I_{i-1}$, $\in_{i-1}$, $\in_{i-2}$, $_i$):

```
3:          ∈_i := maximum (| ∈_{i-1} |, | ∈_{i-2} |) × sign (∈_{i-1})
4:      else
5:          if (∈_{i-1} > 0 and ∈_{i-2} > 0)
6:              ∈_i := minimum (∈_{i-1}, ∈_{i-2})
7:          else
8:              ∈_i := ∈_{i-1}
9:          end
10:     end
11:     if (∈_i > 0)
12:         ŷ_t^a = ŷ_i + ∈_i
13:     else
14:         ŷ_t^a = ŷ_i - ∈_i - padding
15:     End
16:     return (ŷ_t^a, n_s, m_s)
```

According to the proposed strategy of Algorithm 2, the error-adjustment coefficient $\in_i$ that reflects the current tendency for under/over estimation is determined and added to the predicted data. In case of a significant under-estimation, particularly more than a giving tolerance threshold, a padding is added to the adjusted predicted data in order to prevent critical under-estimation and SLA violation (Algorithm 2, line 14). According to a particular embodiment, 10% as a tolerance threshold may be a good value to be considered. Otherwise, the padding value is null.

In the disclosed probabilistic approach, the prediction error $e_i$ is considered as a continuous random variable, denoted by X Its probability density function (PDF), $\rho(x)$, defines a probability distribution for X See, P. F. Dunn. "*Measurement and Data Analysis for Engineering and Science,*" *CRC Press*, Taylor & Francis, 616 p. 2014.

The probability that X will be in interval I, with I=[$x_1$, $x_2$], is given by Equation 4:

$$Pr(x \in I) = \int_I \rho(x)dx = \int_{x_1}^{x_2} \rho(x)dx \quad \text{(Equation 4)}$$

with $\rho(x) \geq 0$ for all x and $\int \rho(x)dx = 1$.

In a particular embodiment, based on the historical data, the interval I is set as an interval of values between the minimum and the maximum of previously observed errors; I=[$e_{min}$, $e_{max}$]. Additionally, two probability intervals $I_{Proba}$ and $\bar{I}_{Proba}$ ($I_{Proba}$=[0,0.1] and $\bar{I}_{Proba}$=[0.1,1]) are defined and it is assumed that: (1) the PDF is Gaussian (most common PDF for continuous process); and (2) an error $e_i$ is more probable if its probability Pr(x∈I) belongs to [0.1,1] and is less probable if its probability Pr(x∈I) belongs to [0,0.1].

Each time a prediction is made, the probabilities of two previous error intervals $Pr_{i-2}(x \in I_{i-2})$ and $Pr_{i-1}(x \in I_{i-1})$ are compared along with the error indicators (i.e., under-estimation if $e_i$<0; over-estimation otherwise) (Line 2). If the two probabilities belong to the same probability interval ($I_{Proba}$) and they have the same indicators, we assume that the system may have a stable tendency and the current prediction is adjusted by the maximum of the previous errors (Line 3). Otherwise, we assume that there is a change in the workload and/or in the system behavior and hence the current prediction is adjusted either (1) by the minimum of the two previous error-adjustment coefficients if they are positives, which denote two consecutive over-estimations, in order to minimize the over-estimation (Lines 5-6), or (2) by the most recent error-adjustment coefficient in order to track the change (Lines 7-8).

The time complexity of the prediction adjustment (Algorithm 2) is influenced by the evaluation of the probabilities of two previous error intervals (Line 1) using numerical integration of probability density function (Equation (4)). The integral is computed via Simpson's rule (See, M. Abramowitz and I. A. Stegun. "Handbook of Mathematical Functions with Formulas, Graphs and Mathematical Tables," *National Bureau of Standards applied Mathematics*, Series. 55, 1972, http://people.math.sfu.ca/~cbm/aands/abramowitz_and_stegun.pdf, last visited 2017-04-28; See also, MathWorks, "*Numerically evaluate integral, adaptive Simpson quadrature,*" 2017, https://www.mathworks.com/help/matlab/ref/quad.html, last visited 2017-04-28; See also, MathWorks. "*Numerical integration*", 2017, https://www-.mathworks.com/help/matlab/ref/integral.html#btdd9x5, last visited 2017-04-28.) in the interval [$e_{min}$, $e_{max}$] with $N_I$ equally spaced points which is performed with the time complexity of $O(N_I)$. The calculation of error-adjustment coefficient $\in_i$ (Line 2-10) has a time complexity O(1). Also, the calculation of adjusted data (Line 11-15) and its return (Line 16) have both O(1). Hence, the time complexity of the prediction adjustment algorithm is $O(N_I)$.+$O(N_I)$+O(1)+O(1)+O(1) which is equivalent to $O(N_I)$.

According to certain embodiments, padding strategies may be applied. For example, when the under-estimation is more than a tolerance threshold (e.g., 10%), an additional adjustment, called padding, is computed. Algorithm 3 is an example for calculating padding ($\hat{y}_t^a$, $y_i$, $n_s$, $m_s$, threshold), according to a particular embodiment:

```
1:      if (ŷ_t^a < y_i) and ((ŷ_t^a - y_i)/y_i < threshold)
2:          σ_current = σ_j (y_{i-n_s}, y_i)
3:          if σ_current > 2σ_previous
4:              padding = mean (σ_j, j ∈ {1, . . . ,l-1})
5:          else
6:              padding = mean (σ_j, j ∈ {1,...,l})
7:          end
8:      else
9:          padding = 0
10:     end
11:     return padding
```

The padding is added to the adjusted predicted data in the next prediction step in order to address quickly the gap between the observed data and the predicted data, and consequently, to prevent a long duration of under-estimation and SLA violation.

According to a particular embodiment, two padding strategies were tested. The first one is based on a ratio r between the observed data and the adjusted data, and the error between them based on Equation 5:

$$\text{padding} = r(\widehat{y_t^a} - y_i) \quad \text{(Equation 5)}$$

where $r = \lceil y_i / \widehat{y_t^a} \rceil$.

This ratio-based padding showed large over-estimations when significant fluctuation occurs in the workload such as sharp increase followed by sharp decrease. Therefore, we propose another padding strategy that considers workload variability. It is based on the standard deviation of the previous observed data. The mean of previous standard deviations of observed data is considered as a value of the padding as represented by Equation 6, in a particular embodiment:

$$\text{padding} = \text{mean}(\sigma_j(y_{i-n_s}, y_i)) \quad \text{(Equation 6)}$$

where $j \in \{1, \ldots, l\}$, l is the number of under-estimations greater than 10% and $n_s$ is the optimal number of training data in the interval $I_l$.

The time complexity of the padding in Algorithm 3 depends on the computation of standard deviation of the previous observed data (Line 2) which is $O(n_s)$, and the mean of previous standard deviations of observed data (Line 4 or Line 6) corresponding to O(l). The rest of the statements in this algorithm have, each, a time complexity O(1). Hence, the time complexity of the padding algorithm is $O(1)+O(n_s)+O(1)+O(l)+O(1)+O(1)$ which is equivalent to $O(n_s)$ having $n_s > l$.

According to certain embodiments, optimization may be applied. For example, time series is an ordered collection of values obtained through repeated measurements, typically over equally-spaced time intervals, and their analysis allows the extraction of a model that describes particular patterns in the collected data. See, W. W. S. Wei. *"Time series analysis: univariate and multivariate methods,"* Redwood City, Calif.; Don Mills, Ont.: Addison-Wesley, 478, p. 1990.

Thereby, for dynamic prediction of resource consumption, real-time data, collected from the system, as time series, is considered, where at each sliding window the observed data are processed and the prediction of the next resource demand is performed. Each set of i observed data is used in the training phase of the prediction model in order to foretell the next j values. Afterwards, the sliding window is slid forward by j values at each prediction step in order to continuously keep track of, and predict the system resource usage.

With the efficiency of the prediction model being mainly affected by the size of the sliding window, we studied as a first step the performance of the typical fixed sliding window strategy. The prediction model was tested with respect to the mean absolute percentage error (MAPE) metric. Different sliding windows were experimented, by varying both training data and predicted data numbers (e.g., (13-20), (10-15), (7-10) respectively), and the ratio between them. Although the fixed sliding window strategy was able to provide efficient prediction results with MAPE<10%, it requires a prior testing and evaluation phase to determine the best pair $(n_s, m_s)$. Furthermore, the results showed critical performance degradation when abnormal system behaviors are observed. Abnormal behavior might be for instance a sharp increase or sharp decrease of workload. Observations showed that an efficient and adaptive prediction, which is able to deal with typical and unpredictable system behaviors, depends on both the sizes of the sliding window and the predicted data. Both parameters have direct impact on the accuracy of the prediction, notably when significant fluctuations occur in the workload. Therefore, the main objective in this part is to find the best size of sliding window ($n_s$) and the best number of predicted data ($m_s$) that minimize the over-estimation and the under-estimation of resource demand before each prediction process.

According to a particular embodiment, the following was performed:
1) Problem Formulation: These goals were defined in a multi-objective optimization problem which was formulated as follows:
   Minimize over-estimation: The mean of over-estimations is equal to the total of over-estimations divided by the number of over-estimation occurrences in historical data. An adjusted predicted data is considered as an over-estimation if it is greater than its corresponding observed data.

$$F_1 = \min\left(\frac{1}{n_{oe}} \sum_{k=1}^{l} \sum_{j=1}^{n} \gamma_i \left(\sum_{i=1}^{m} [(\hat{y}_{ijk} + \varepsilon_{ijk}) - y_{ijk}]\beta_i\right)\right) \quad \text{(Equation 7)}$$

Minimize under-estimation: The mean of under-estimations is equal to the total of under-estimations divided by the number of under-estimation occurrences in historical data. An adjusted predicted data is considered as under-estimation if it is less than its corresponding observed data.

$$F_2 = \min\left(\frac{1}{n_{ue}} \sum_{k=1}^{l} \sum_{j=1}^{n} \gamma_i \left(\sum_{i=1}^{m} [(\hat{y}_{ijk} - \varepsilon_{ijk} - \alpha_i \text{padding}) - y_{ijk}](1-\beta_i)\right)\right) \quad \text{(Equation 8)}$$

So, the multi-objective optimization problem, according to a particular embodiment, is:

$$F = \min\{F_1, F_2\} \quad \text{(Equation 9)}$$

Subject to:

$$n \in \mathbb{N} \quad \text{(c1)}$$

$$m \in \mathbb{N} \quad \text{(c2)}$$

$$m \leq n \quad \text{(c3)}$$

$$\alpha_i = \{0,1\} \quad \text{(c4)}$$

$$\beta_i = \{0,1\} \quad \text{(c5)}$$

$$\gamma_i = \{0,1\} \quad \text{(c6)}$$

These objective functions aim to minimize the resource wastage and SLA violation, respectively. The constraints c1, c2 ensure that the sizes of data and the sliding window belong to the set of natural numbers, while c3 confirms that the number of predicted data is less or equal to the sliding window size. Finally, constraints c4, c5 and c6 define the decision variables for padding, over-estimation and the sliding window size, respectively, as binary variables. The solution of this problem is the best combination of sliding window size ($n_s$) and the predicted data number ($m_s$) which minimizes over-estimation and under-estimation of the resource requirements, allows dynamic prediction and improves the latter's performance.

2). Heuristic Algorithm-Genetic Algorithm: GAs form an abstraction of biological evolution, which imitate the natural evolution process to solve an optimization problem. (See, H. Tout; C. Talhi; N. Kara; A. Mourad, "Selective Mobile Cloud Offloading to Augment Multi-Persona Performance and Viability," *IEEE Transactions on Cloud Computing*, vol. PP, no. 99, pp. 1-14, 2016; See also, G. Mitsuo, R. Cheng "*Genetic algorithms and engineering optimization,*" New York, N.Y.: J. Wiley and Sons, 495, p. 2000; See also, X. Yang "*Engineering optimization: an introduction with meta-heuristic applications,*" Hoboken, N.J.: Wiley. 347 p. 2010). GAs are heuristic methods that aim to determine the best solution by simulating the propagation of the fittest individuals over consecutive generations. The fitness of a solution is based on a function that aims to minimize or maximize particular objective(s). Through crossover, mutation and selection operators, Genetic Algorithm is able to generate diversified individuals and find the best among them. This approach might be a good alternative to exhaustive search as shown in experimental evaluation section.

As disclosed herein, GA is used to determine the optimal size of the sliding window and the optimal number of predicted data ($n_s$, $m_s$). Hereafter, it is explained how GA was adapted to solve the optimization problem defined in the previous section, in a particular embodiment.

a) Individuals of Populations: Each individual in the populations is represented by two elements. The first element is a size of the sliding window $n_i$; and the second one is a size of the predicted data $m_i$. The set of ($n_i$, $m_i$) combinations constitutes a population. For instance, the set {(5, 3), (10, 3), (10, 7), (15, 6), (15, 10), (20, 4)} represents a population of six different individuals.

b) Fitness function and Selection: The fitness function in GA aims to assign a score to each individual according to its efficiency in resolving the problem. In this work, the score of a solution is computed by evaluating the objective functions $F_1$ and $F_2$. Next, the selection of individuals is carried out by evaluating their fitness. Individuals with higher fitness are more likely to reproduce in the next generations.

c) Crossover and Mutation: Next, crossover and mutation operators are to be applied with $r_c$ and $r_m$ rates, respectively. Typically, crossover of two individuals can be conducted by swapping elements from both individuals resulting in two offspring. For instance, individuals (10, 3) and (20, 7) can be crossed over the first element in each to generate the two offspring (20, 3) and (10, 7). Alternatively, mutation can be realized by flipping randomly an element in different individuals, selected based on $r_m$. For example, an individual (10, 7) could be mutated in its second element to yield (10, 2).

d) Algorithm 4—Genetic Algorithm—All the steps of the adapted GA are described in Algorithm 4 (($\widehat{y_t^a}$, {($n_i$, $m_i$)}):

```
1:  Initialize N = population size; r_c = crossover rate; r_m = mutation rate
2:  Initialize population index j = 0
3:  Generate the initial population P_j
4:  for each individual (n_i, m_i) in P_j
5:     Evaluate objective functions F_1(ŷ_t^a, (n_i, m_i)), F_2(ŷ_t^a, (n_i, m_i))
6:  end for
7:  do
8:     Select × best (n_i, m_i) and insert them into P_{j+1}
9:     Crossover r_c × n individuals to produce new offspring (n_i, m_i) and insert them into P_{j+1}
10:    Mutate r_m × n individuals to produce new offspring (n_i, m_i) and insert them into P_{j+1}
11:    for each individual (n_i, m_i) in P_{j+1}
12:       Evaluate objective functions F_1(ŷ_t^a, (n_i, m_i)), F_2(ŷ_t^a, (n_i, m_i))
13:    end for
14:    j= j+1
15: while stopping criteria is not met
16: return the fittest (n_s, m_s) from P_j
```

It starts by generating the initial population. The fitness of each individual is computed by evaluating both pre-defined objective functions that aim to minimize under and over estimations. The fittest individuals in the population are selected and inserted into next population. Crossover and mutation operators are applied to produce a new generation of solutions ($n_s$, $m_s$) and the fitness of these individuals is calculated. This process is repeated until the stopping condition is met. The latter can be defined as time constraint, number of generations, or any other adequate criterion. Finally, the fittest pairs ($n_s$, $m_s$) from the last generation are reported. If several solutions are provided by GA, the solution that most minimizes the under-estimation is selected for the next prediction because we consider that the under-estimation is more critical than the over-estimation in terms of cost of SLA violation.

The complexity of Algorithm 4 depends on many factors, namely, the fitness function evaluation, the population size, the individuals' length (number of elements in each individual) and the number of generations (i.e., iterations). The initialization of parameters and the generation of initial population each has time complexity O(1) (Lines 1-3). The evaluation of the fitness function has time complexity O(N), where N is the size of population (Line 4-6). The tournament selection, the crossover and the mutation (Lines 7-15) have time complexity O(INL) where I is the number of generations and L is the length of an individual (length of ($n_s$, $m_s$)=2). Finally, the return statement (Line 16) has time complexity O(1). Thereby, the time complexity of Algorithm 4 is O(1)+O(N)+O(INL)+O(1) which is equivalent to O(INL).

The cost of the resource demand prediction was evaluated in terms of SLA violation and resource wasting by computing the probability of under-estimations (e.g., $Pr_{UnderEstim}^{PredictData}$), the mean of over-estimations (e.g., $E_{OverEstim}^{PredictData}$) and the mean time between under-estimations (MTBUE) for both predicted and adjusted data. Also, the mean of over-estimations was considered in case of static provisioning of resources (threshold-based provisioning) that is an over-provisioning of resources applied in legacy systems. It represents the maximum of allocated resources for specific system and load profile. This metric was used to compare the gain of resources between our approach (prediction and adjustment) and the static provisioning approach. The details about the calculation of suggested metrics are presented in Table I, which is discussed above.

To evaluate the algorithm with different types of virtualized systems/applications, data from OpenIMS telecommunication service platform (Configurations 1 and 2 presented in Table III) was used, data furnished by an IMS service provider (Datasets 1 and 2), and data extracted from Google cluster data available online (See, C. Reiss et al. "*Google cluster-usage traces: format+schema,*" https://drive.google.com/file/d/0B5g07T_gRDg9Z0lsSTEtTWt-pOW8/view, 2014.) (Datasets 3 and 4). By processing data from various systems and load profiles, the ability of the algorithm to predict accurately the resource utilization within various types of systems/applications, workloads and situations (predictable vs. unpredictable workloads) was evaluated. The evaluation was as follows:

Experimental Setting

1) Testbed Setup

The testbed is built with 4 servers, all connected to the same local area network. For IMS Core components, we used OpenIMS Core, which is an open source implementation of IMS Core developed by Fraunhofer FOKUS IMS Bench. See, Fraunhofer FOKUS, "*Open Source IMS Core by cnd*", Online http://www.openimscore.org/, accessed: 2017 Jun. b 6.

The virtualization of IMS Core (CSCFs and HSS) is based on Linux container technology. See, Linux Containers. Online https://linuxcontainers.org/, accessed: 2017 Jun. b 6.

Further, a SIP client was created using the instantiation of SIPp version 591 (October 2010), which is a traffic generator. See, R. GAYRAUD et al. "SIPp". Online http://sipp.sourceforge.net/, accessed: 2017 Jun. b 6.

Figure 3:
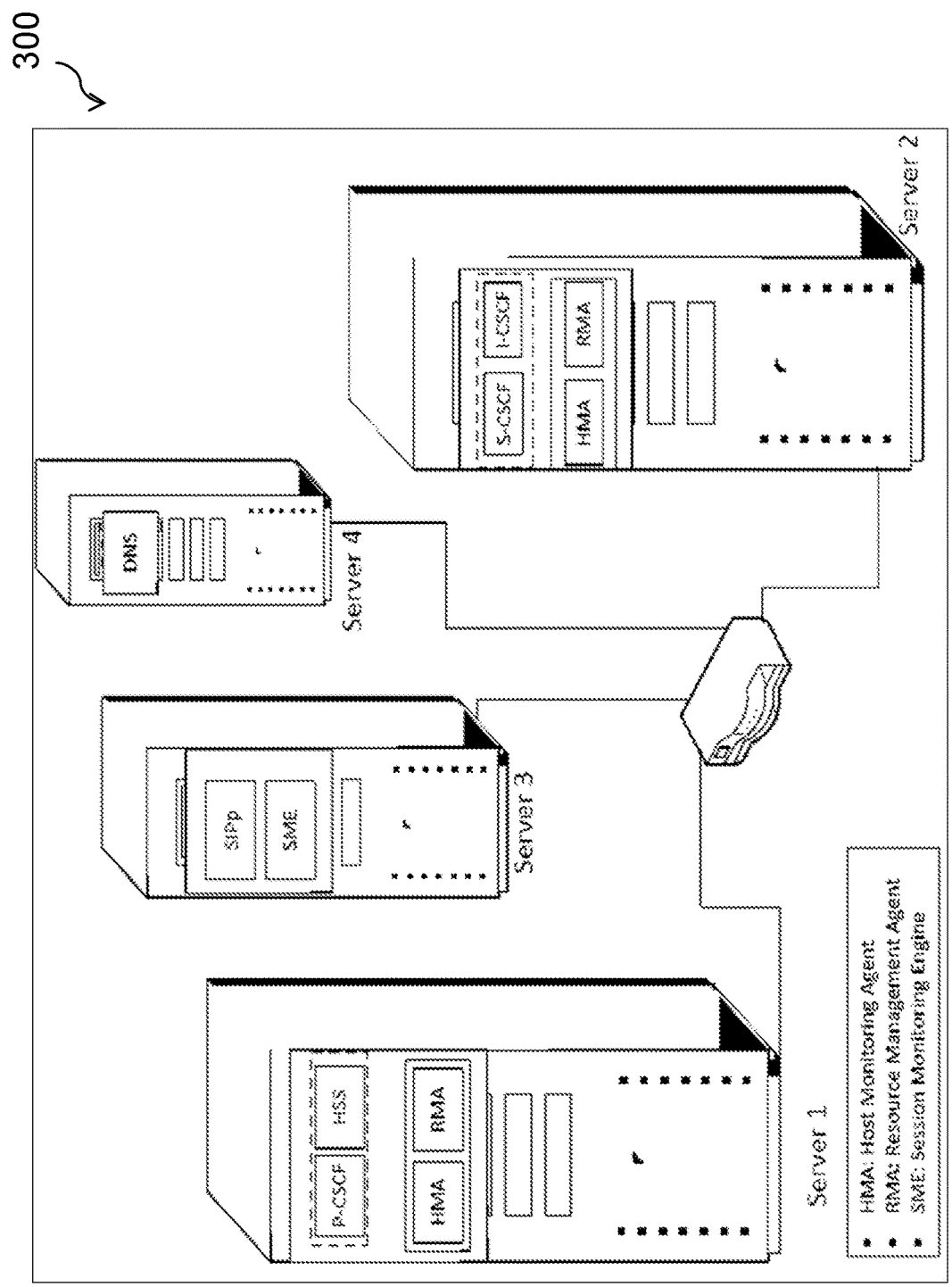
FIG. 3 illustrates an example testbed, according to certain embodiments.

The Virtualized P-CSCF and HSS are hosted in Server 1; whereas, the Virtualized S-CSCF and I-CSCF are hosted in Server 2. The high-level monitoring of virtualized CSCF entities and the management of resources are done by the Host Monitoring Agent (HMA) and Resource Management Agent (RMA), respectively. HMA and RMA are deployed in both Server 1 and Server 2. Server 3 hosts SIPp and the Session Monitoring Engine (SME). DNS (Domain Name System) is hosted in Server 4. Each physical machine has an Intel core i7 3.6 GHz CPU, 24.576 GB of RAM, and a Linux Ubuntu operating system version 14.04. FIG. 3 illustrates the example testbed, according to certain embodiments.

For the parameters of Kriging method, the type was essentially set to universal Kriging and the variogram model to the spherical one with a range of 0.2 and a sill of 1. These parameters are set through tests trying to find the configuration that minimizes the prediction errors.

Concerning the GA configuration, we use the values presented in Table II. The population is initialized as {(10,3), (10,5), (10,7), (20,5), (20,10), (20,14)}, the selection is based on tournament selection function (See, G. Mitsuo, R. Cheng, *Genetic algorithms and engineering optimization*, New York, N.Y.: J. Wiley and Sons. 495 p. 2000.), the single-point crossover is used while random modification of $n_i$ or $m_i$ values is performed for the mutation. The crossover and the mutation probabilities are set to 0.8 and 0.2, respectively. Finally, the stopping criterion is set to the number of iterations needed to find the optimal solution.

TABLE II

PARAMETERS OF GENETIC ALGORITHM

| Parameter | Value |
| --- | --- |
| Population size | 6 pairs ($n_i$, $m_i$) |
| Initial Population | {(10, 3), (10, 5), (10, 7), (20, 5), (20, 10), (20, 14)} |
| Selection | Tournament selection function. |
| Crossover probability | 0.8 |
| Mutation probability | 0.2 |
| Crossover operator | Single point |
| Mutation operator | Random modification of $n_i$ or $m_i$ values |
| Number of generations | 201 |
| Stopping criteria | Number of iterations needed to find the optimal solution |

2.) Data/Load Profile

Tests were focused on the CPU consumption of virtualized S-CSCF node, because the CPU load has a significant effect on performance (See, J. Liang, J. Cao, J. Wang and Y. Xu, "Long-term CPU load prediction," *Dependable, Autonomic and Secure Computing* (*DASC*), 2011 IEEE Ninth International Conference, 2011, pp. 23-26. IEEE), and the performance analysis of OpenIMS showed that S-CSCF is a bottleneck in IMS (See, I. M. Mkwawa, and D. D. Kouvatsos, "Performance modelling and evaluation of handover mechanism in IP multimedia subsystems", *Systems and Networks Communications*, 2008, ICSNC'08, 3rd International Conference. IEEE, 2008, pp. 223-228). Furthermore, the analysis of CPU, memory and bandwidth consumption of OpenIMS testbed shows a strong correlation between them. Then, we perform several tests on OpenIMS platform using different load profiles, representing for instance, a sharp decrease (Configuration1 (Conf1)), or a sharp decrease followed by a sharp increase (Configuration2 (Conf2)) of the workload. The data from OpenIMS platform was collected every 5 seconds.

The data from the IMS service provider represent CPU consumption collected from multiple machines every 5 minutes during 16 hours. We present in this article two examples of datasets (different numbers and amplitudes of workload fluctuations), namely, Dataset1 (Dset1) and Dataset2 (Dset2).

The Google cluster data trace (clusterdata-2011-2) represents 29 days' worth of cell information from May 2011, on a cluster of about 12500 machines (packed into racks, and connected by a high-bandwidth cluster network). A cell is a set of machines, typically all in a single cluster, that shares a common cluster-management system that allocates jobs to machines. A job is comprised of one or more tasks (accompanied by a set of resource requirements) (See, C. Reiss et al. "Google cluster-usage traces: format+schema," https://drive.google.com/file/d/0B5g07T_gRDg9Z0lsSTEtTWtpOW8/view, 2014). Because of the large size of the Google cluster data, CPU consumption of tasks from multiple data files for a given machine and a given job was extracted. For instance, Dataset3 (Dset3) and Dataset4 (Dset4) are presented, which denote the CPU consumption of tasks identified by 85 and 42, respectively, collected every 5 minutes.

The descriptions of the load profiles Configuration1 and Configuration2 are presented in Table III:

TABLE III

DESCRIPTION OF LOAD PROFILES (OpenIMS PLATFORM)

| Load Profile | Description |
| --- | --- |
| Configuration1 (Conf1) | start at 150 CPS, increment: 50 CPS/10 sec until 400 CPS, 400 CPS constant during 100 sec, 600 CPS constant during 300 sec, 200 CPS decrement: 50 CPS/50 sec until 50 CPS |
| Configuration2 (Conf2) | start at 150 CPS, increment: 50 CPS/10 sec until 400 CPS, 400 CPS constant during 100 sec, 600 CPS constant during 300 sec, 5 CPS during 60 sec, 400 CPS constant during 300 sec |

3) Assumptions

The monitoring tools are sufficiently accurate.

The monitoring and collecting data from the system are continual and in real-time.

The Linux container-based virtualization and the technique of CPU core isolation guarantee that each service/application cannot access hardware and software resources of others. They also insure that the collected data reflect the effective service/application consumption.

Results and Analysis: In this section, the evaluation of the ability of our algorithm to accurately estimate resource consumption, and the efficiency of the proposed techniques is presented 1) Prediction and Adjustment: A set of alternative scenarios is defined: (1) prediction with fixed-size sliding window and fixed number of predicted data: $(n_i, m_i)=(10,5)$, and without adjustment; (2) prediction with variable number of predicted data: $(n_i, m_i)=(10, [7,5])$, adjustment and standard deviation-based padding (See Algorithm 3), and (3) prediction with the sliding window size and the number of predicted data selected dynamically by GA (Algorithm 4), adjustment and standard deviation-based padding (See Algorithm 3:). FIG. 4 illustrates a table, which details the characteristics of the tested scenarios. In all scenarios, the prediction is dynamic and adaptive to the workload profile. But the sliding window size and the number of predicted data are adaptive and dynamic only in the third scenario which represents our approach. Furthermore, the adjustment and the padding are dynamic and adaptive in the second and the third scenarios. By defining and testing these scenarios, it is aimed to compare the impact of each proposed technique on the resource demand prediction accuracy and the cost in terms of under-estimation and over-estimation.

Figure 5A:
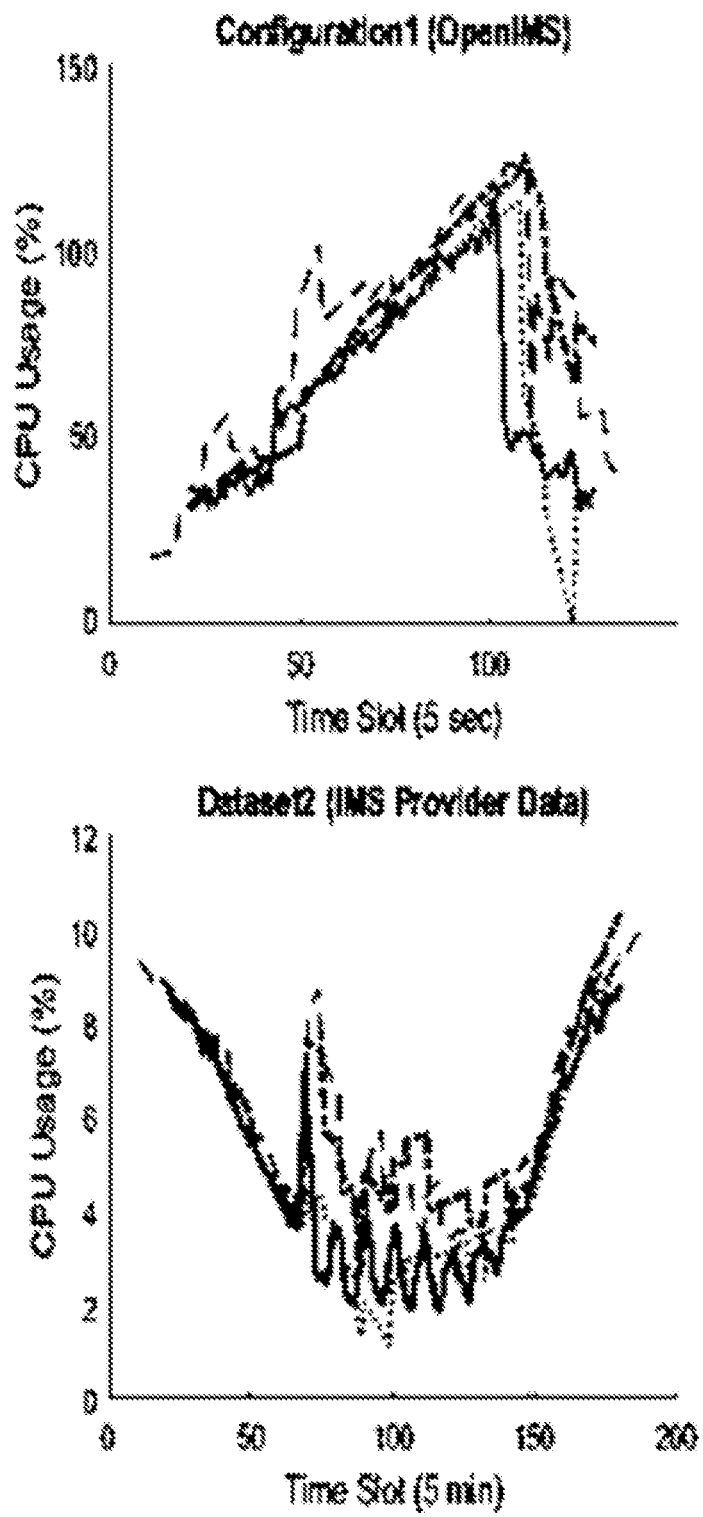
FIGS. 5A-5C present the results of the predicting of CPU consumption for the defined scenarios and various systems and workload profiles, according to certain embodiments.
Figure 5B:
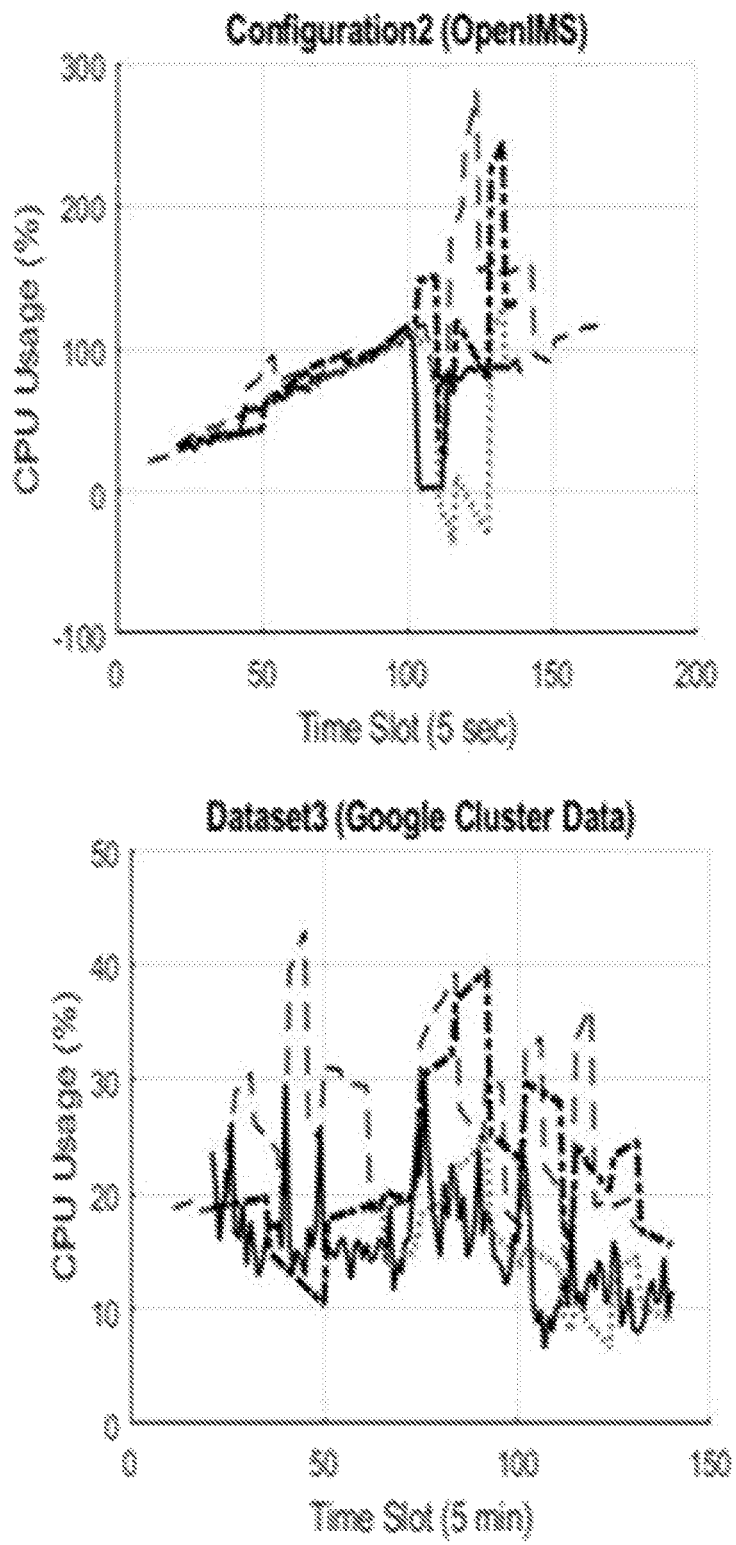
Figure 5C:
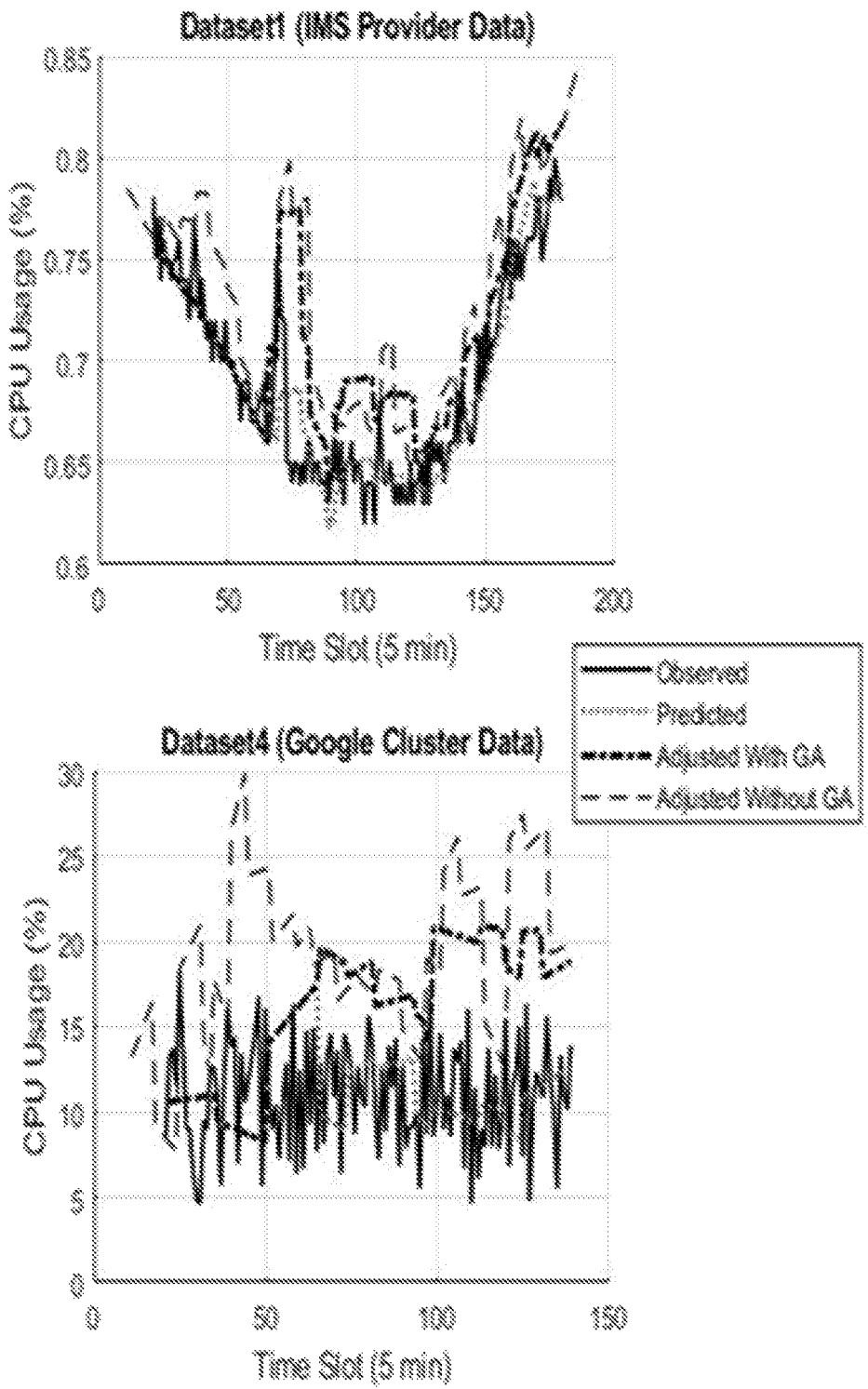

FIGS. 5A-5C present the results of the predicting of CPU consumption for the defined scenarios and various systems and workload profiles, according to certain embodiments. During the initialization phase, several training and prediction steps using Kriging method are performed (without adjustment of the prediction results) until collecting sufficient data for applying adjustment and optimization. Therefore, under-estimation cases are observed before the time slot 60 in FIGS. 5A-5C. Mainly, the results show that the prediction using Kriging method is able to follow the trend of workloads and to adapt to changes in case of all used configurations (OpenIMS) and datasets (IMS provider data and Google cluster data). But, it is less effective when large and unexpected variations (e.g., Configuration2) or a lot of fluctuations (e.g., Dataset4) occur in the workload, which cause long and significant under-estimations and SLA violations.

Therefore, according to certain embodiments, an adjustment of the prediction is proposed to reduce long or/and frequent under-estimations. The results of adjusted prediction and a variable padding show a clear improvement in prediction in terms of a significant reduction of under-estimations.

However, some cases of large over-estimation were observed. For example, Dataset3 and Dataset4 (FIGS. 5B and 5C, plot: adjusted without GA) present cases of large-overstimation. These over-estimations arise mainly when the variation and the magnitude of the workload in current prediction phase are different from the previous phase. It is mainly due to the adjustment and the padding values which are computed based on the results of previous prediction steps. Further, it is noticed from several experiments that the performance of prediction is influenced by the size of the sliding window and the number of predicted data. Thus, the use of GA is proposed to dynamically provide the size of the sliding window and the number of predicted data that minimize under-estimation and over-estimation at each prediction step. The results of the adjusted prediction with the usage of GA (see FIGS. 5A-5C plots adjusted with GA) show a remarkable decrease in over-estimations, while under-estimations decrease (e.g., see FIGS. 5B and 5C: Dataset3 and Dataset4) or is close to the results of the adjusted prediction without GA (e.g., see FIGS. 5A and 5B: Configuration1, Configuration2). Therefore, it is concluded that the accuracy and the adaptability of our algorithm are improved significantly thanks to the prediction and the adjustment techniques combined with GA.

To evaluate and quantify the efficiency of our algorithm, the probability of under-estimation, the mean of over-estimations, the mean of over-estimations for threshold-based provisioning, and the mean time between under-estimations (MTBUE) are computed for both predicted and adjusted data. FIG. 6 summarizes the evaluation metrics for the defined scenarios, configurations and datasets.

As shown in FIGS. 6A-6C, the prediction without any adjustment is characterized by a large probability of under-estimation (between 0.44 and 0.54) (FIG. 6.c1), a mean of over-estimation under 10% for all configurations and datasets (FIG. 6.c2), and a short MTBUE: less than 17 sec for all configurations and less than 21 min for all datasets (FIG. 6.c3). These results reveal the limitations of using the prediction without adjustment specifically in the presence of fluctuating workloads.

The comparison of results presented in Table A(1) in FIG. 6A, Table B(1) in FIG. 6B, and Table C(1) in FIG. 6C show that our algorithm (prediction with adjustment and padding) minimizes remarkably the under-estimation for all configurations and datasets. Indeed, the prediction adjustment allows reducing the under-estimation by 86% in average compared to prediction without adjustment. For instance, the probability of under-estimation decreases from 0.39 to 0.04 for Configuration1, and from 0.48 to 0.01 for Dataset4 (see Table A(1) in FIG. 6A). Moreover, our approach results in a significant increase of MTBUE. For example, the MTBUE increases from 20 min to 50 min and from 10 min to 115 min in the case of Dataset2 and Dataset4, respectively (see Table A(3) in FIG. 6A).

Concerning the wasting of resources due to over-estimation, our algorithm significantly improves the efficient consumption of CPU resources in comparison with threshold-based provisioning (static provisioning) for both prediction and adjustment, for all configurations and datasets. Actually, our approach is able to reduce over-estimation by 67% on average compared to the threshold-based provisioning (see Table A(2) in FIG. 6A and TABLE B(2) in FIG. 6B). For instance, the mean of over-estimation of CPU consumption decreases from 64% to 32% and from 0.31% to 0.03% in the case of Configuration2 and Dataset1, respectively (see Table A(2) in FIG. 6A).

The main improvements given by GA to the proposed algorithm are the dynamic selection of the sliding window size and the number of predicted data, as well as the flexibility and the adaptability to changes in the workload while minimizing SLA violation and resource wasting. As shown in FIGS. 6A and 6B, the probability of under-estimation decreases (see Table A(1) in FIG. 6A and Table B(1) in FIG. 6B), and the MTBUE increases using GA in both Dataset3 and Dataset4 (see Table A(3) in FIG. 6A and Table B(3) in FIG. 6B). In contrast, the scenario without GA gives better results for Configuration1, Configuration2, Dataset1 and Dataset2. Concerning over-estimation (see Table A(2) in FIG. 6A and Table B(2) in FIG. 6B), the scenario with GA improves results in almost all configurations and datasets, except Configuration1 and Dataset2.

However, the probability of under-estimation as well as the mean of over-estimation remain close for the two scenarios (adjustment without vs with GA). For instance, the usage of GA enables to decrease the probability of under-estimation and the mean of over-estimation from 0.05 to 0.03 (see Table A(1) in FIG. 6A and Table B(1) in FIG. 6B) and from 12% to 10% (see Table A(2) in FIG. 6A and Table B(2) in FIG. 6B) respectively for Dataset3. When the scenario without GA (scenario 2) outperforms the scenario with GA (scenario 3), it may be due to the use of small and prefixed sliding window size and number of predicted data (10, [7,5]) that allows a quick adjustment to variation, for instance, mean of over-estimation for Configuration1 and Dataset2 (see Table A(2) in FIG. 6A and Table B(2) in FIG. 6B). But this scenario loses in flexibility and adaptability of prediction and it is less accurate in the case of fluctuating workload (e.g., FIGS. 5A-5C Dataset3 and Dataset 4). Therefore, the challenge is to find the optimal trade-off between the cost of SLA violation and the cost of resource wasting (minimizing under-estimation and over-estimation) while ensuring adaptability and flexibility of the prediction algorithm.

As a padding strategy, the padding value was first computed dynamically based on the prediction error and the ratio r between the adjusted data and the observed data (see Equation 5). Good results were obtained in terms of under-estimation probability but the mean of over-estimation was observed to be significantly higher when the workload tends to fluctuate. Then, standard-deviation-based (std) padding was tested with different strategies by considering:

strategy 1 (std1): the std of observed data in previous prediction step.
strategy 2 (std2): the mean of the previous std that were computed in case of under-estimation greater than 10%.
strategy 3 (std3): the mean of previous std that were computed in case of under-estimation greater than 10%. If the current std value (current under-estimation >10%) is greater than twice previous std value ($\sigma_{current} > 2\sigma_{previous}$), it is excluded from the mean std estimation.

The results of the std-based padding strategies show an improvement in terms of reducing over-estimation. However, in a particular embodiment, the selected strategy, namely, strategy 3 (see Algorithm 3) outperformed in almost all scenarios and for all datasets. For instance, the mean of over-estimations of adjusted data in case of Configuration2 with ratio-based padding is about 41.88, whereas the std-based padding reduced over-estimation mean to 31.26 (std3). Table IV presents the results of evaluation metrics of various padding strategies using Configuration2 data.

TABLE IV

| Padding Strategy | Probability of under-estimation | Mean of over-estimation (%) | Mean of over-estimation Static provisioning (%) | MTBUE (sec) |
|---|---|---|---|---|
| ratio | 0.05 | 41.88 | 65.3 | 54.16 |
| std1 | 0.07 | 31.55 | 64.48 | 49.375 |
| std2 | 0.058 | 32.28 | 63.61 | 50.71 |
| std3 | 0.06 | 31.26 | 64.48 | 50 |

Thus, the disclosed techniques provide a generic, dynamic and multi-step ahead prediction of resource demand in virtualized systems. Based on time series and machine learning method, the proposed algorithm is able to provide real-time prediction of resource needs without any prior knowledge or assumptions on the system or its internal behavior. When unexpected workload fluctuations occur, the proposed algorithm is capable of adapting to these changes with a relatively short delay. The techniques disclosed herein also include a dynamic adjustment based on the estimation of prediction error probability, and padding strategies to minimize SLA violation and reduce over-estimation. Furthermore, the proposed algorithm is able to generate dynamically the size of the sliding window and the number of predicted data for bringing flexibility of the prediction and improving its performance. Thorough experiments have been conducted using various virtualized systems and different workload profiles. The results show that the proposed algorithm is able to reduce the under-estimation average by 86% compared to prediction without adjustment. Further, the proposed algorithm decreases the over-estimation average by 67% against threshold-based provisioning. For future, additional experiments and analysis using datasets from different types of systems and applications would be valuable to reinforce the general characteristics of the disclosed algorithm. Additionally, further investigations and evaluations are to be conducted in order to improve the adjustment delay, as well as the trade-off between under-estimation and over-estimation. Moreover, study for abnormal behavior will be investigated.

Figure 7:
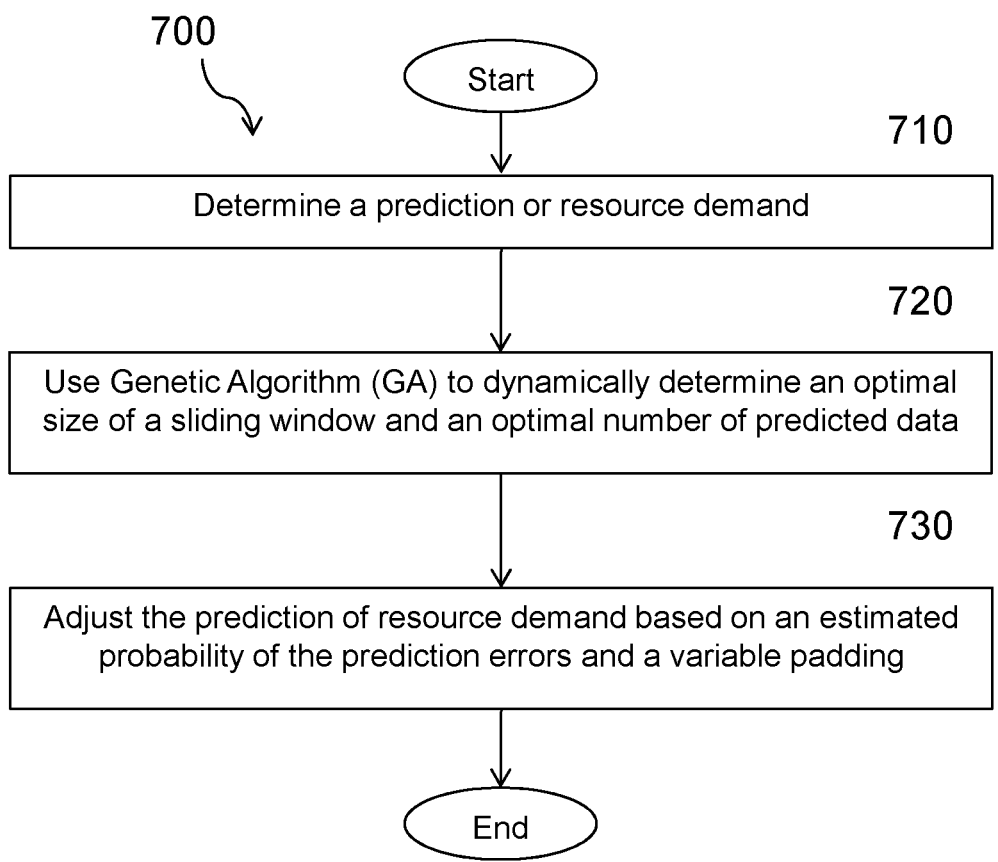
FIG. 7 illustrates an example method for predicting resource consumption by a system, according to certain embodiments.

FIG. 7 depicts a method 700 for predicting resource consumption by a system. According to certain embodiments, the system may be a virtualized system. In accordance with particular embodiments, the method begins at step 710 with determining a prediction of resource demand. The method proceeds to step 720 with using Genetic Algorithm (GA) to dynamically determine an optimal size of a sliding window and an optimal number of predicted data. The method proceeds to step 730 with adjusting the prediction of resource demand based on an estimated probability of the prediction errors and a variable padding.

According to certain embodiments, the prediction of resource demand is determined using Kriging method and/or dynamic machine learning-based prediction. In a particular embodiment, for example, determining the prediction of the resource demand comprises reading collected resource consumption data ($y_i$), initializing each of a size of the sliding window ($n_i$) and a number of predicted data ($m_i$) to a respective maximum, setting an error-adjustment coefficient and at least one padding value to zero, and performing an initialization phase. In a particular embodiment, the initialization phase comprises performing consecutive training and prediction ($\hat{y}_i$) based on Kriging method, gathering historical data, and based on the historical data, applying adjustment and optimization during a prediction step.

According to certain embodiments, the prediction of the resource demand is determined, for each pair ($n_i$, $m_i$) of the set of all possible combinations of $n_i$, $m_i$ values, based on the historical data. The prediction of resource demand may be adjusted for each pair ($n_i$, $m_i$) of the set of all possible combinations of $n_i$, $m_i$ values. In a particular embodiment, using the GA to dynamically determine the optimal size of the sliding window and the optimal number of predicted data comprises determining an optimal pair ($n_s$, $m_s$) that comprises the optimal size of the sliding window and the optimal number of predicted data. In a particular embodiment, the method may further include using the optimal pair ($n_s$, $m_s$) to predict upcoming resource consumption based on the Kriging method and the adjustment of the prediction of resource demand according at least one error-adjustment values and outputting the adjusted predicted data ($\widetilde{y}_t^a$) that estimate the future resource consumption.

According to certain embodiments, the method may further include collecting observed data ($y_i$), comparing the observed data ($y_i$) to adjusted predicted data ($\widetilde{y}_t^a$), and determining whether an under-estimation is more than a threshold above which under-estimation is not tolerated (e.g., 10%, threshold defined based on empirical study). If the under-estimation is more than the threshold, the method may include evaluating the padding value and restarting the processes of prediction-adjustment taking padding into account. If the under-estimation is not more than the threshold, the method may include gathering the observed data for a subsequent prediction step.

According to certain embodiments, steps 710, 720, and 730 may be repeatedly performed to continually or periodically estimate resource consumption.

Figure 8:
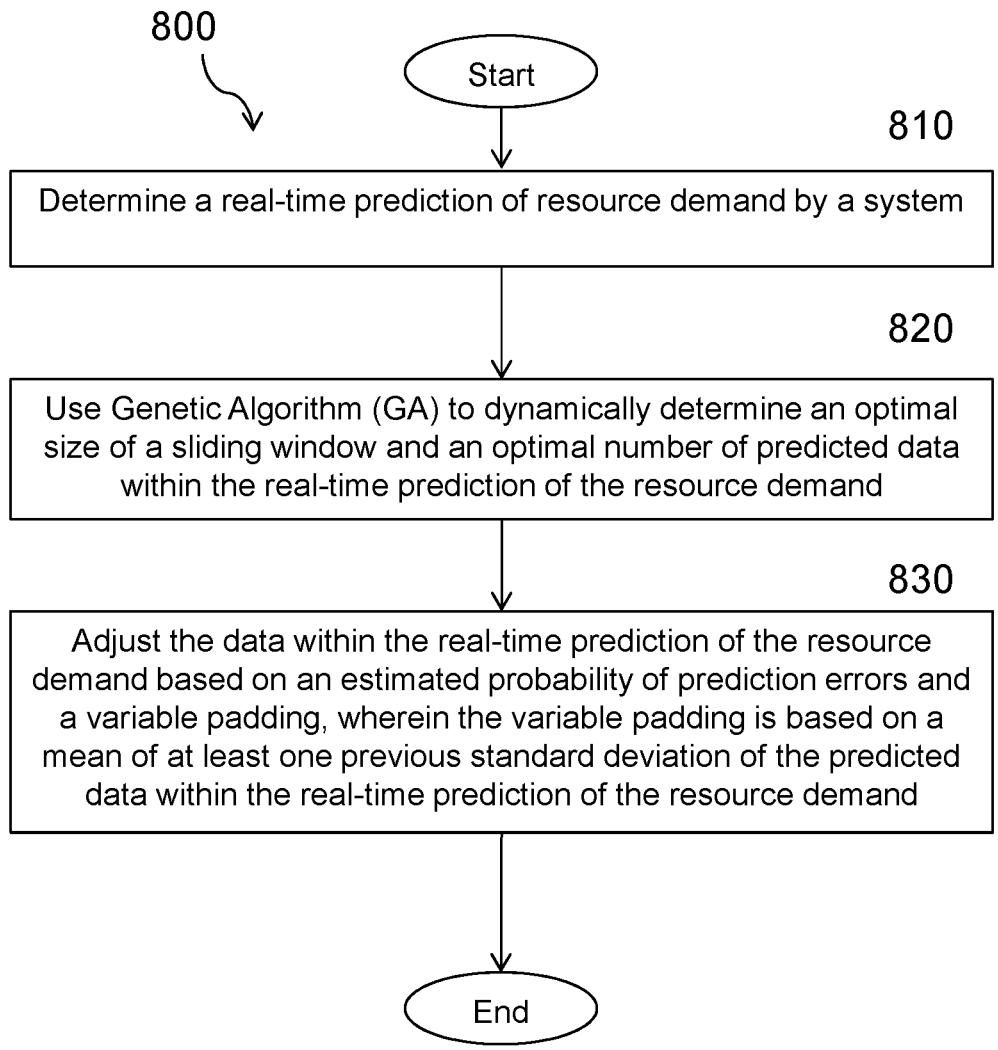
FIG. 8 illustrates another method for real-time prediction of resource consumption by a system, according to certain embodiments.

FIG. 8 depicts another method 800 for real-time prediction of resource consumption by a system. According to a particular embodiment, the system is one or more virtualized systems.

In accordance with particular embodiments, the method begins at step 810 with determining a real-time prediction of resource demand by a system. At step 820, GA is used to dynamically determine an optimal size of a sliding window and an optimal number of predicted data within the real-time prediction of the resource demand. At step 830, the data within the real-time prediction of the resource demand is adjusted based on an estimated probability of prediction errors and a variable padding. According to certain embodiments, the variable padding is based on a mean of at least one previous standard deviation of the predicted data within the real-time prediction of the resource demand.

In a particular embodiment, the real-time prediction of the resource demand is determined using Kriging method.

In a particular embodiment, the real-time prediction of the resource demand is determined based on dynamic machine learning-based prediction and time series prediction.

In a particular embodiment, the prediction of the resource demand includes reading collected resource consumption data ($y_i$), initializing each of a size of the sliding window ($n_i$) and the number of predicted data ($m_i$) to a respective maximum such that ($n_i$, $m_i$):=(max ({$n_i$}), max ({$m_i$})), setting an error-adjustment coefficient to minimize the estimated probability of the prediction errors and performing error adjustment on the predicted data based on the error-adjustment coefficient, and after performing the error adjustment on the predicted data, determining whether the predicted data is underestimated. If the estimated probability of the prediction errors is underestimated, at least one padding value is added, and an initialization phase is performed.

According to a further particular embodiment, the initialization phase includes performing consecutive training and prediction ($\hat{y}_i$) based on Kriging method, gathering historical data and, based on the historical data, applying adjustment and optimization during a subsequent prediction of resource demand by the system.

In a particular embodiment, the prediction of the resource demand is determined, for each pair ($n_i$, $m_i$) of a set of all possible combinations of $n_i$, $m_i$ values, based on the historical data, and the prediction of the resource demand is adjusted for each pair ($n_i$, $m_i$) of the set of all possible combinations of $n_i$, $m_i$ values.

In a particular embodiment, using GA to dynamically determine the optimal size of the sliding window and the optimal number of the predicted data includes determining an optimal pair ($n_s$, $m_s$) that comprises the optimal size of the sliding window and the optimal number of the predicted data. In a further particular embodiment, the optimal pair ($n_s$, $m_s$) is used to predict a future resource consumption by the system based on the Kriging method, and the prediction of the resource demand is adjusted according to at least one error-adjustment value. The adjusted predicted data ($\widetilde{y}_t^a$) that estimates the future resource consumption by the system is output.

In a particular embodiment, the method further includes collecting real-time observed data ($y_i$), comparing the observed data ($y_i$) to adjusted predicted data ($\widetilde{y}_t^a$), and determining whether an under-estimation of resource demand is more than a threshold above which under-estimation is not tolerated. If the under-estimation is more than the threshold, a padding value is evaluated and the processes of prediction—adjustment is restarted taking the padding value into account. On the other hand, if the under-estimation is not more than the threshold, the observed data is gathered for a subsequent prediction step.

In a particular embodiment, any one or combination of the above-recited steps may be repeatedly performed to estimate the resource demand of the system.

Figure 9:
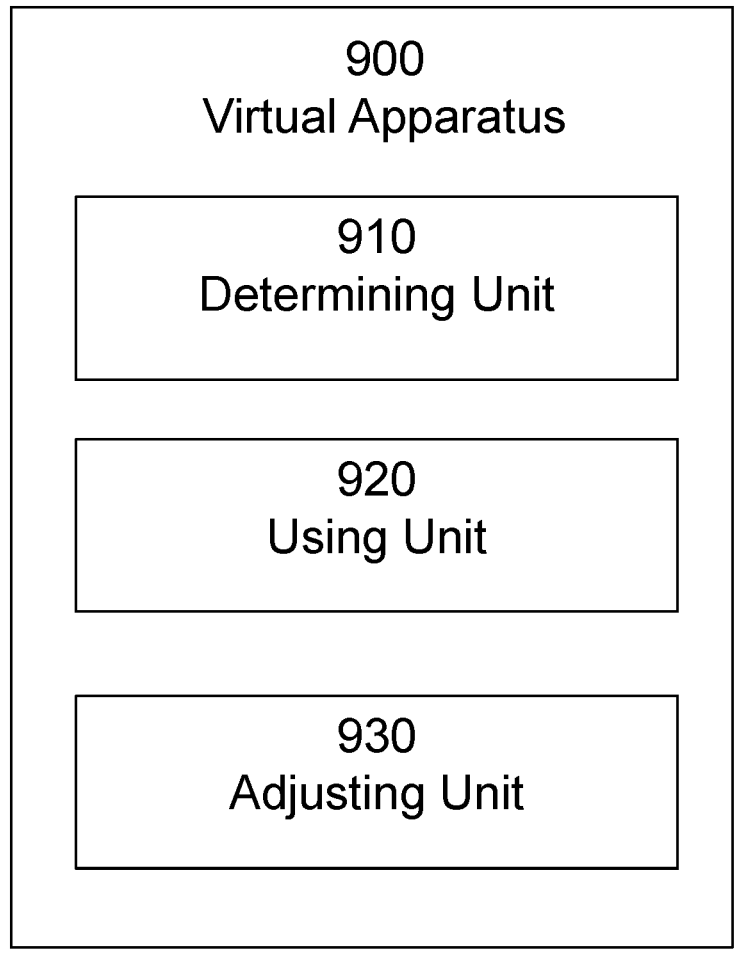
FIG. 9 illustrates an example apparatus operable to carry out the example methods described herein, according to certain embodiments.

FIG. 9 illustrates a schematic block diagram of an apparatus 900 operable to carry out the example method described with reference to FIGS. 7 and/or 8 and possibly any other processes or methods disclosed herein. It is also to be understood that the method of FIGS. 7 and/or 8 are not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Determining Unit 910, Using Unit 920, Adjusting Unit 930, and any other suitable units of apparatus 900 to perform corresponding functions according one or more embodiments of the present disclosure.

As illustrated in FIG. 9, apparatus 900 includes Determining Unit 910, Using Unit 920, Adjusting Unit 930. In a particular embodiment, Determining Unit 920 may operate to perform certain of the determining functions of apparatus 900. For example, Determining Unit 920 may determine a prediction of resource demand. As another example, Determining Unit 920 may determine a real-time prediction of resource demand by a system.

In a particular embodiment, Using Unit 920 may perform certain of the using functions of apparatus 900. For example, in a particular embodiment, Using Unit 920 may use GA to dynamically determine an optimal size of a sliding window and an optimal number of predicted data. As another example, in another particular embodiment, Using Unit 920 may use GA to dynamically determine an optimal size of a sliding window and an optimal number of predicted data within the real-time prediction of the resource demand.

In a particular embodiment, Adjusting Unit 930 may perform certain of the adjusting functions of apparatus 900. For example, in a particular embodiment, Adjusting Unit 930 may adjust the prediction of resource demand based on an estimated probability of the prediction errors and a variable padding. As another example, in a particular embodiment, Adjusting Unit 930 may adjust the data within the real-time prediction of the resource demand based on an estimated probability of prediction errors and a variable padding. According to certain embodiments, the variable padding is based on a mean of at least one previous standard deviation of the predicted data within the real-time prediction of the resource demand.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EXAMPLE EMBODIMENTS

Embodiment 1. A method for predicting resource consumption by a system, the method comprising:
(a) determining a prediction of resource demand;
(b) using Genetic Algorithm (GA) to dynamically determine an optimal size of a sliding window and an optimal number of predicted data; and
(c) adjusting the prediction of resource demand based on an estimated probability of the prediction errors and a variable padding Embodiment 2. The method of embodiment 1, wherein the system is one or more virtualized systems.

Embodiment 3. The method of any one of embodiments 1 to 2, wherein the prediction of resource demand is determined using Kriging method.

Embodiment 4. The method of any one of embodiments 1 to 3, wherein the prediction of resource demand is determined based on dynamic machine learning-based prediction.

Embodiment 5. The method of any one of embodiments 1 to 4, wherein determining the prediction of the resource demand comprises:
reading collected resource consumption data ($y_i$);
initializing each of the size of the sliding window ($n_i$) and the number of predicted data ($m_i$) to a respective maximum,
setting an error-adjustment coefficient and at least one padding value to zero; and
performing an initialization phase.

Embodiment 6. The method of embodiment 5, wherein the initialization phase comprises:
performing consecutive training and prediction ($\hat{y}_i$) based on Kriging method; and
gathering historical data;
based on the historical data, applying adjustment and optimization during a prediction step.

Embodiment 7. The method of any one of embodiments 5 to 6, wherein:
the prediction of the resource demand is determined, for each pair ($n_i$, $m_i$) of the set of all possible combinations of $n_i$, $m_i$ values, based on the historical data; and
the prediction of resource demand is adjusted for each pair ($n_i$, $m_i$) of the set of all possible combinations of $n_i$, $m_i$ values.

Embodiment 8. The method of any one of embodiments 5 to 7, wherein using the GA to dynamically determine the optimal size of the sliding window and the optimal number of predicted data comprises determining an optimal pair ($n_s$, $m_s$) that comprises the optimal size of the sliding window and the optimal number of predicted data.

Embodiment 9. The method of embodiment 8, further comprising:
using the optimal pair ($n_s$, $m_s$) to predict upcoming resource consumption based on the Kriging method and the adjustment of the prediction of resource demand according at least one error-adjustment values; and
outputting the adjusted predicted data ($\overline{y}_t^a$) that estimate the future resource consumption.

Embodiment 10. The method of any one of embodiments 1 to 9, further comprising:
collecting observed data ($y_i$);
comparing the observed data ($y_i$) to adjusted predicted data ($\overline{y}_t^a$);

determining whether an under-estimation is more than a threshold above which under-estimation is not tolerated (e.g., 10%, threshold defined based on empirical study); and if the under-estimation is more than the threshold, evaluating the padding value and restarting the processes of prediction-djustment taking padding into account; and if the under-estimation is not more than the threshold, gathering the observed data for a subsequent prediction step.

Embodiment 11. The method of any one of embodiments 1 to 10, wherein repeatedly performing steps (a)-(c) to estimate resource consumption.

Embodiment 12. A non-transitory computer-readable medium storing instructions for predicting resource consumption by a system, the instructions being executed by processing circuitry to:
(a) determine a prediction of resource demand;
(b) use Genetic Algorithm (GA) to dynamically determine an optimal size of a sliding window and an optimal number of predicted data; and
(c) adjust the prediction of resource demand based on an estimated probability of the prediction errors and a variable padding Embodiment 13. The non-transitory computer-readable medium of embodiment 12, wherein the system is one or more virtualized systems.

Embodiment 14. The non-transitory computer-readable medium of any one of embodiments 12 to 13, wherein the prediction of resource demand is determined using Kriging method.

Embodiment 15. The non-transitory computer-readable medium of any one of embodiments 12 to 14, wherein the prediction of resource demand is determined based on dynamic machine learning-based prediction.

Embodiment 16. The non-transitory computer-readable medium of any one of embodiments 12 to 15, wherein determining the prediction of the resource demand comprises:
reading collected resource consumption data ($y_i$);
initializing each of a size of the sliding window ($n_i$) and a number of predicted data ($m_i$) to a respective maximum,
setting an error-adjustment coefficient and at least one padding value to zero; and
performing an initialization phase.

Embodiment 17. The non-transitory computer-readable medium of embodiment 15, wherein the initialization phase comprises:
performing consecutive training and prediction ($\hat{y}_i$) based on Kriging method; and
gathering historical data;
based on the historical data, applying adjustment and optimization during a prediction step.

Embodiment 18. The non-transitory computer-readable medium of any one of embodiments 16 to 17, wherein:
the prediction of the resource demand is determined, for each pair ($n_i$, $m_i$) of the set of all possible combinations of $n_i$, $m_i$ values, based on the historical data; and
the prediction of resource demand is adjusted for each pair ($n_i$, $m_i$) of the set of all possible combinations of $n_i$, $m_i$ values.

Embodiment 19. The non-transitory computer-readable medium of any one of embodiments 16 to 18, wherein using the GA to dynamically determine the optimal size of the sliding window and the optimal number of predicted data comprises determining an optimal pair ($n_s$, $m_s$) that comprises the optimal size of the sliding window and the optimal number of predicted data.

Embodiment 20. The non-transitory computer-readable medium of embodiment 19, wherein the instructions are further executed by the processing circuitry to:
use the optimal pair ($n_s$, $m_s$) to predict upcoming resource consumption based on the Kriging method and the adjustment of the prediction of resource demand according at least one error-adjustment values; and
output the adjusted predicted data ($\bar{y}_t^a$) that estimate the future resource consumption.

Embodiment 21. The non-transitory computer-readable medium of any one of embodiments 12 to 21, wherein the instructions are further executed by the processing circuitry to:
collect observed data ($y_i$);
compare the observed data ($\hat{y}_i$) it to adjusted predicted data ($\bar{y}_t^a$);
determine whether an under-estimation is more than a threshold above which under-estimation is not tolerated (e.g., 10%, threshold defined based on empirical study); and
if the under-estimation is more than the threshold, evaluate the padding value and restarting the processes of prediction-adjustment taking padding into account; and
if the under-estimation is not more than the threshold, gather the observed data for a subsequent prediction step.

Embodiment 22. The non-transitory computer-readable medium of any one of embodiments 12 to 21, wherein the instructions are further executed by the processing circuitry to repeatedly perform steps (a)-(c) to estimate resource consumption.

Embodiment 23. An apparatus for predicting resource consumption by a system, the apparatus comprising:
processing circuitry configured to:
(a) determine a prediction of resource demand;
(b) use Genetic Algorithm (GA) to dynamically determine an optimal size of a sliding window and an optimal number of predicted data; and
(c) adjust the prediction of resource demand based on an estimated probability of the prediction errors and a variable padding Embodiment 24. The apparatus of embodiment 23, wherein the system is one or more virtualized systems.

Embodiment 25. The apparatus of any one of embodiments 23 to 24, wherein the prediction of resource demand is determined using Kriging method.

Embodiment 26. The apparatus of any one of embodiments 23 to 25, wherein the prediction of resource demand is determined based on dynamic machine learning-based prediction.

Embodiment 27. The apparatus of any one of embodiments 23 to 26, wherein determining the prediction of the resource demand comprises:
reading collected resource consumption data ($y_i$);
initializing each of a size of the sliding window ($n_i$) and a number of predicted data ($m_i$) to a respective maximum, setting an error-adjustment coefficient and at least one padding value to zero; and
performing an initialization phase.

Embodiment 28. The apparatus of embodiment 27, wherein the initialization phase comprises:
performing consecutive training and prediction ($\hat{y}_i$) based on Kriging method; and
gathering historical data;
based on the historical data, applying adjustment and optimization during a prediction step.

Embodiment 29. The apparatus of any one of embodiments 27 to 28, wherein:
the prediction of the resource demand is determined, for each pair ($n_i$, $m_i$) of the set of all possible combinations of $n_i$, $m_i$ values, based on the historical data; and
the prediction of resource demand is adjusted for each pair ($n_i$, $m_i$) of the set of all possible combinations of $n_i$, $m_i$ values.

Embodiment 30. The apparatus of any one of embodiments 27 to 29, wherein
using the GA to dynamically determine the optimal size of the sliding window and the optimal number of predicted data comprises determining an optimal pair ($n_s$, $m_s$) that comprises the optimal size of the sliding window and the optimal number of predicted data.

Embodiment 31. The apparatus of embodiment 30, wherein the instructions are further executed by the processing circuitry to:
use the optimal pair ($n_s$, $m_s$) to predict upcoming resource consumption based on the Kriging method and the adjustment of the prediction of resource demand according at least one error-adjustment values; and
output the adjusted predicted data ($\widetilde{y}_t^a$) that estimate the future resource consumption.

Embodiment 32. The apparatus of any one of embodiments 23 to 31, wherein the instructions are further executed by the processing circuitry to:
collect observed data ($y_i$);
compare the observed data ($y_i$) it to adjusted predicted data ($\widetilde{y}_t^a$);
determine whether an under-estimation is more than a threshold above which under-estimation is not tolerated (e.g., 10%, threshold defined based on empirical study); and
if the under-estimation is more than the threshold, evaluate the padding value and restarting the processes of prediction-adjustment taking padding into account; and
if the under-estimation is not more than the threshold, gather the observed data for a subsequent prediction step.

Embodiment 33. The apparatus of any one of embodiments 23 to 32, wherein the instructions are further executed by the processing circuitry to repeatedly perform steps (a)-(c) to estimate resource consumption.

Embodiment 34. The apparatus of any one of embodiments 23 to 33, wherein the apparatus comprises a radio node.

Embodiment 35. The apparatus of embodiment 34, wherein the radio node comprises a wireless device or a network node.

Embodiment 36. A method for predicting resource consumption by a system, the method comprising:
(a) determining a prediction of resource demand;
(b) using Genetic Algorithm (GA) to dynamically determine an optimal size of a sliding window and an optimal number of predicted data; and
(c) based on the optimal size of the sliding window and the optimal number of predicted data, determining an estimated probability of prediction errors and a variable padding value;
(d) based on the estimated probability of prediction errors and the variable padding value, adjusting the prediction of resource demand.

Embodiment 37. The method of embodiment 36, further comprising:
reading collected resource consumption data ($y_i$);
initializing each of a size of a sliding window ($n_i$) and a number of predicted data ($m_i$) to a respective maximum value; and
setting an error-adjustment coefficient and a padding value to zero.

Embodiment 38. The method of any one of embodiments 36 to 37, wherein steps (a) and (d) are applied for each pair ($n_i$, $m_i$) of the set of all possible combinations of $n_i$, $m_i$ values.

Embodiment 39. The method of any one of embodiments 36 to 38 wherein step (b) is performed based on the prediction of resource demand to determine optimal sizes for the sliding window and prediction ($n_s$, $m_s$) that minimize under-estimation and over-estimation.

Embodiment 40. The method of embodiment 39, further comprising:
using the optimal pair ($n_s$, $m_s$) to determine a prediction of an upcoming resource consumption based on the Kriging method;
adjusting the predicted upcoming resource consumption based on previous error-adjustment values; and
providing adjusted predicted data that estimate the future resource consumption ($\widetilde{y}_t^a$).

Embodiment 41. The method of any one of embodiments 36 to 40, further comprising:
collecting first observed data is collected ($y_i$);
comparing the first observed data is collected ($y_i$) to corresponding adjusted predicted data ($\widetilde{y}_t^a$);
if under-estimation is more than a given threshold above which under-estimation is not tolerated, estimating the padding value and restarting the process taking padding into account;
if under-estimation is not more than the given threshold above which under-estimation is not tolerated, gather observed data for future prediction of resource consumption.

Embodiment 42. The method of embodiment 42, wherein the given threshold is ten percent.

Embodiment 43. A computer program comprising instructions which when executed on a computer perform any of the methods of embodiments 36 to 42.

Embodiment 44. A computer program product comprising computer program, the computer program comprising instructions which when executed on a computer perform any of the methods of embodiments 36 to 42.

Embodiment 45. A non-transitory computer readable medium storing instructions which when executed by a computer perform any of the methods of embodiments 36 to 42.

Embodiment 46. A computer program comprising instructions which when executed on a computer perform any of the methods of embodiments 1 to 11.

Embodiment 47. A computer program product comprising computer program, the computer program comprising instructions which when executed on a computer perform any of the methods of embodiments 1 to 11.

Embodiment 48. A non-transitory computer readable medium storing instructions which when executed by a computer perform any of the methods of embodiments 1 to 11.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for provisioning resources of an adaptive computing system in response to workload demands based on real-time prediction of future resource consumption by the adaptive computing system, the method comprising:
    collecting resource consumption data ($y_i$);
    determining a real-time prediction of resource demand by the system comprising reading the collected resource consumption data ($y_i$), initializing each of a size of a sliding window ($n_i$) and a number of predicted data ($m_i$) to a respective maximum such that ($n_i$, $m_i$):=(max ($\{n_i\}$), max ($\{m_i\}$));
    setting an error-adjustment coefficient to minimize an estimated probability of a prediction error;
    performing error adjustment on the predicted data based on the error—adjustment coefficient;
    using a Genetic Algorithm (GA) to dynamically determine an optimal size of the sliding window and an optimal number of the predicted data within the real-time prediction of the resource demand to minimize the prediction errors;
    adjusting the data within the real-time prediction of the resource demand based on an estimated probability of the prediction error and a variable padding, the variable padding based on a mean of at least one previous standard deviation of the predicted data within the real-time prediction of the resource demand calculated such that the variable padding=mean($\sigma_j(y_{i-n_s}, y_i)$), where $j \in \{1, \ldots, 1\}$, 1 is the number of under-estimations greater than 10% and $\sigma_j$ is the standard deviation of the $j^{th}$ under estimation;
    after performing the error adjustment on the predicted data, based on the estimated probability of the prediction errors being underestimated, adding at least one padding value;
    performing an initialization phase using the GA to dynamically determine the optimal size of the sliding window and the optimal number of the predicted data comprises determining an optimal pair ($n_s$, $m_s$) that comprises the optimal size of the sliding window and the optimal number of the predicted data;
    using the optimal pair ($n_s$, $m_s$) to predict future resource consumption by the system based on the Kriging method and the adjustment of the prediction of the resource demand according to at least one error-adjustment value; and
    based on the predicted future resource consumption, provisioning resources of the adaptive computing system in response to workload demands.

2. The method of claim 1, wherein the system is at least one virtualized system.

3. The method of claim 1, further comprising outputting adjusted predicted data ($\widetilde{y_t^a}$) that estimates the future resource consumption by the system used for provisioning resources for the system.

4. The method of claim 1, wherein the real-time prediction of the resource demand is determined based on dynamic machine learning-based prediction and time series prediction.

5. The method of claim 1, wherein the initialization phase comprises:
    performing consecutive training and prediction ($\hat{y}_i$) based on Kriging method;
    gathering historical data; and
    based on the historical data, applying adjustment and optimization during a subsequent prediction of resource demand by the system.

6. The method of claim 1, wherein:
    the prediction of the resource demand is determined, for each pair ($n_i$, $m_i$) of a set of all possible combinations of $n_i$, $m_i$ values, based on historical data; and
    the prediction of the resource demand is adjusted for each pair ($n_i$, $m_i$) of the set of all possible combinations of $n_i$, $m_i$ values.

7. The method of claim 1, further comprising:
    collecting real-time observed data ($y_i$);
    comparing the observed data ($y_i$) to adjusted predicted data ($\widetilde{y_t^a}$);
    determining whether an under-estimation of resource demand is more than a threshold above which under-estimation is not tolerated;
    if the under-estimation is more than the threshold, evaluating a padding value and restarting the processes of prediction-adjustment taking the padding value into account; and
    if the under-estimation is not more than the threshold, gathering the observed data for a subsequent prediction step.

8. An apparatus for provisioning resources of an adaptive computing system in response to workload demands based on real-time prediction of future resource consumption by the adaptive computing system, the apparatus comprising:
    processing circuitry configured to:
        collect resource consumption data ($y_i$);
        determine a real-time prediction of resource demand by the system comprising reading the collected resource consumption data ($y_i$), initializing each of a size of a sliding window ($n_i$) and a number of predicted data ($m_i$) to a respective maximum such that ($n_i$, $m_i$):= (max ({$n_i$}), max ({$m_i$}));

set an error-adjustment coefficient to minimize an estimated probability of a prediction error;

perform error adjustment on the predicted data based on the error-adjustment coefficient;

use a Genetic Algorithm (GA) to dynamically determine an optimal size of the sliding window and an optimal number of the predicted data within the real-time prediction of the resource demand to minimize the prediction error;

adjust the data within the real-time prediction of the resource demand based on an estimated probability of the prediction errors and a variable padding, the variable padding based on a mean of at least one previous standard deviation of the predicted data within the real-time prediction of the resource demand calculated such that the variable padding=mean ($\sigma_j(y_{i-n_s}, y_i)$), where j∈{1, ..., l}l is the number of under-estimations greater than 10% and $\sigma_j$ is the standard deviation of the $j^{th}$ under estimation;

after performing the error adjustment on the predicted data, determine whether the predicted data is underestimated and, if the estimated probability of the prediction errors is underestimated, adding at least one padding value;

perform an initialization phase using the GA to dynamically determine the optimal size of the sliding window and the optimal number of the predicted data comprises determining an optimal pair ($n_s$, $m_s$) that comprises the optimal size of the sliding window and the optimal number of the predicted data;

use the optimal pair ($n_s$, $m_s$) to predict future resource consumption by the system based on the Kriging method and the adjustment of the prediction of the resource demand according to at least one error-adjustment value; and based on the predicted future resource consumption, provision resources of the adaptive computing system in response to workload demands.

9. The apparatus of claim 8, wherein the system is at least one virtualized system.

10. The apparatus of claim 8, further comprising outputting adjusted predicted data (ya) that estimates the future resource consumption by the system used for provisioning resources for the system.

11. The apparatus of claim 8, wherein the real-time prediction of the resource demand is determined based on dynamic machine learning-based prediction and time series prediction.

12. The apparatus of claim 8, wherein the initialization phase comprises:

performing consecutive training and prediction ($\hat{y}_t$) based on Kriging method; and gathering historical data; and based on the historical data, applying adjustment and optimization during a subsequent prediction of resource demand by the system.

13. The apparatus of claim 8, wherein:

the prediction of the resource demand is determined, for each pair ($n_i$, $m_i$) of a set of all possible combinations of $n_i$, $m_i$ values, based on historical data; and the prediction of the resource demand is adjusted for each pair ($n_i$, $m_i$) of the set of all possible combinations of $n_i$, $m_i$ values.

14. The apparatus of claim 8, wherein the instructions are further executed by the processing circuitry to:

collect real-time observed data ($y_i$);

compare the observed data ($y_i$) to adjusted predicted data ($\overline{y_i^a}$);

determine whether an under-estimation of resource demand is more than a threshold above which under-estimation is not tolerated; and if the under-estimation is more than the threshold, evaluate a padding value and restarting the processes of prediction-adjustment taking the padding value into account; and if the under-estimation is not more than the threshold, gather the observed data for a subsequent prediction step.

* * * * *